US006693911B2

(12) United States Patent
Yamanaka

(10) Patent No.: US 6,693,911 B2
(45) Date of Patent: *Feb. 17, 2004

(54) ASYNCHRONOUS TRANSFER MODE APPARATUS

(75) Inventor: Masayuki Yamanaka, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,326

(22) Filed: Mar. 16, 1999

(65) Prior Publication Data

US 2003/0086429 A1 May 8, 2003

(30) Foreign Application Priority Data

Mar. 16, 1998 (JP) .......................... 10-065187

(51) Int. Cl.[7] .......................... H04L 12/28; H04L 12/56
(52) U.S. Cl. .............. 370/395.3; 370/395.51
(58) Field of Search .................. 370/389, 392, 370/393, 395, 396, 397, 399, 401, 409, 395.1, 395.3, 395.31, 395.32, 395.51, 395.6

(56) References Cited

U.S. PATENT DOCUMENTS

| 5,485,456 A | | 1/1996 | Shtayer et al. |
| 5,724,358 A | * | 3/1998 | Headrick et al. ........... 370/418 |
| 5,778,001 A | * | 7/1998 | Nakayama et al. ......... 370/516 |
| 5,812,527 A | * | 9/1998 | Kline et al. ................. 370/232 |
| 5,878,045 A | * | 3/1999 | Timbs ........................ 370/466 |
| 5,889,778 A | * | 3/1999 | Huscroft et al. ....... 370/395.31 |
| 5,978,377 A | * | 11/1999 | Kim et al. ............. 370/395.71 |

FOREIGN PATENT DOCUMENTS

| JP | 1-190196 | 7/1989 |
| JP | 1-240050 | 9/1989 |
| JP | 1-289342 | 11/1989 |
| JP | 3-207140 | 9/1991 |

OTHER PUBLICATIONS

"Utopia Level 2, V1.0", The ATM Forum Technical Committee, af–phy–0039.000, Jun. 1995.
HPPI I–Field Proposal (to facilitate networking over HPPI), Network Systems Corporation, May 15th, 1990.
A Single–Chip Controller for 1.2. GBPS Shared Buffer ATM Switches. Publication Date: May 5, 1997 XP–000751520.

* cited by examiner

Primary Examiner—Wellington Chin
Assistant Examiner—William Schultz
(74) Attorney, Agent, or Firm—Katten Muchin Zavis Rosenman

(57) ABSTRACT

An ATM apparatus includes an ATM device, and a plurality of devices arranged in a multistage formation in which the ATM device is located at a top of the multistage structure. The ATM device and the plurality of devices employ a given interface using an address signal and a control signal, and transfer routing information including address information on at least one of the devices by using the address signal and a data signal written into a given field of an ATM cell.

13 Claims, 20 Drawing Sheets

FIG. 4A

| 8 BIT 0 |
|---|
| HEADER #1 |
| HEADER #2 |
| HEADER #3 |
| HEADER #4 |
| UDF |
| PAYLOAD #1 |
| PAYLOAD #2 |
| ⋮ |
| PAYLOAD #48 |

FIG. 4B

| 15 BIT | 0 |
|---|---|
| HEADER #1 | HEADER #2 |
| HEADER #3 | HEADER #4 |
| UDF #1 | UDF #2 |
| PAYLOAD #1 | PAYLOAD #2 |
| PAYLOAD #3 | PAYLOAD #4 |
| ⋮ | ⋮ |
| PAYLOAD #48 | PAYLOAD #48 |

FIG. 6A

| SIGNAL | DIRECTION | EXPLANATION |
|---|---|---|
| TxAddr [4:0] | P←A | TRANSMIT ADDRESS OF PHY LAYER DEVICE |
| TxData [7:0] | P←A | EXTENDED TRANSMIT DATA IN 16-BIT MODE |
| TxData [15:8] | P←A | |
| TxSOC | P←A | START OF CELL |
| TxEnb* | P←A | DATA TRANSFER ENABLE |
| TxFull*/ TxClav | P→A | FIFO BUFFER FULL / CELL BUFFER AVAILABLE |
| TxClk | P←A | TRANSFER / INTERFACE TRANSMIT CLOCK |
| TxPrty | P←A | TRANSMIT DATA ODD PARITY |
| TxRef* | P←A | TRANSMIT REFERENCE(ex.8kH) |

FIG. 6B

| SIGNAL | DIRECTION | EXPLANATION |
|---|---|---|
| RxAddr [4:0] | P←A | RECEIVE ADDRESS OF PHY LAYER DEVICE |
| RxData [7:0] | P→A | EXTENDED RECEIVE DATA IN 16-BIT MODE |
| RxData [15:8] | P→A | |
| RxSOC | P→A | START OF CELL |
| RxEnb* | P←A | DATA TRANSFER ENABLE |
| RxEmpty*/ RxClav | P→A | FIFO BUFFER IDLE / CELL BUFFER AVAILABLE |
| RxClk | P←A | TRANSFER / INTERFACE RECEIVE CLOCK |
| RxPrty | P→A | RECEIVE DATA ODD PARITY |
| RxRef* | P→A | RECEIVE REFERENCE(ex.8kH) |

ASYNCHRONOUS TRANSFER MODE APPARATUS

BACKGROUND OF THE INVENTION

1. Field of the Invention

The present invention generally relates to an asynchronous transfer mode (ATM) apparatus which multiplexes and demultiplexes ATM cells, and more particularly to an ATM apparatus configured so that a plurality of ATM apparatuses which send and receive ATM cells through a Level 2 UTOPIA interface are connected in a hierarchical formation.

The ATM Forum Technical Committee proposes the Level 2 UTOPIA interface (UTOPIA)is an abbreviation of the Universal Test & Operations PHY Interface for ATM. The Level 2 UTOPIA interface prescribes an interface between an ATM layer device and a PHY (physical) layer device. More particularly, the Level 2 UTOPIA interface defines a single-stage structure in which a plurality of PHY layer devices are connected to a single ATM layer device. The maximum number of PHY layer devices connectable to the ATM layer device is equal to eight for 155 Mbps, and four for 622 Mbps. Hence, only a limited number of subscribers connected to the PHY layer devices can be accommodated in the single-stage structure.

2. Description of the Related Art

FIGS. 1 and 2 show a network system equipped with an ATM apparatus which performs multiplexing and demultiplexing of ATM cells. Referring to FIG. 1, the system includes in-house devices 13-1 of subscribers #1–#N, terminal devices 13-11, network terminals 13-12, and an office station 13-2. The office station 13-2 includes an ATM switch 13-21, an access network device 13-22, and an operation system part (OPS) 13-2. Referring to FIG. 2, a cabinet 14-1 is connected to the office station 13-2, which includes the ATM switch 13-21. The cabinet 14-1 includes an access network device 14-11 and an operating system part 14-12.

The network system shown in FIGS. 1 and 2 is a network system which employs an asymmetrical digital subscriber line (abbreviated as ADSL) transmission system. The ADSL transmission system is promising as a transmission system capable of sending data to the subscribers at high speed, such as digital communications through the Internet.

The access network devices 13-22 and 14-11 receive data received via the asymmetrical digital subscriber lines from the terminal devices 13-11 in the subscriber houses, and multiplex the received data in a cell multiplexing fashion. Then, the access network devices 13-22 and 14-11 send the cell-multiplexed data to the ATM switch 13-21 via an optical fiber. Further, the access network devices 13-22 and 14-11 demultiplex cell-multiplexed data transmitted from the ATM switch 13-21 via the optical fiber, and distribute demultiplexed data to the subscriber terminals 13-1 via the asymmetrical digital subscriber lines. Hence, the access network devices 13-22 and 14-11 are ATM apparatuses that perform ATM cell processes such as multiplexing and demultiplexing of a large number of ATM cells.

FIG. 3 illustrates a structure of the access network device 13-22 or 14-11. The access network device includes asymmetrical digital subscriber line (ADSL) packages (cards) 15-1, a control package 15-2 and a 155 Mbps interface package 15-3. Each of the ADSL packages 15-1 is made up of asymmetrical digital subscriber line terminating devices (ATU-C) 15-11, and a cell multiplexing/demultiplexing device 15-12. The control package 15-2 includes a cell multiplexing/demultiplexing device 15-21, an ATM switch chip 15-22, a central processing unit (CPU) 15-23, an Ethernet interface part 15-24, and a cell multiplexing/demultiplexing device 15-25. The ATM switch chip 15-22 includes a routing table 15-221. The 155 Mbps interface package 15-3 includes an SDH terminating part (STM-1) 15-31 and an optical module 15-32.

In each of the ADSL packages 15-1, the cell multiplexing/demultiplexing device 15-12 respectively send data received from the asymmetrical digital subscriber lines to the cell multiplexing/demultiplexing device 15-12, which multiplexes the received data in the cell multiplexing formation. Then, the cell-multiplexed data is output to the control package 15-2. Cell-multiplexed data output from the control package 15-2 is demultiplexed by the cell multiplexing/demultiplexing device 15-12 in each of the ADSL packages 15-1. The multiplexed data are then sent to the asymmetrical digital subscriber lines.

In the control package 15-2, the cell multiplexing/demultiplexing device 15-21 further multiplexes the cell-multiplexed data output from the ADSL packages 15-1, and send the resultant cell-multiplexed data to the ATM switch chip 15-22. Further, the cell multiplexing/demultiplexing device 15-21 demultiplexes cell-multiplexed data output from the ATM switch chip 15-22, and send demultiplexed cell data to the ADSL packages 15-1.

Further, the cell multiplexing/demultiplexing device 15-25 multiplexes cell-multiplexed data output from the 155 Mbps interface package 15-3, and send the resultant cell-multiplexed data to the ATM switch chip 15-22. Further, the cell multiplexing/demultiplexing device 15-25 demultiplexes cell-multiplexed data output from the ATM switch chip 15-22, and send demultiplexed cell data to the 155 Mbps interface package 15-3.

The ATM Forum proposes an interface between the ATM layer device and the PHY layer device as a standardized interface in the ATM apparatuses that perform cell multiplexing and demultiplexing. Such a standardized interface is called UTOPIA.

The ATM Forum proposes some levels of UTOPIA. The Level 2 UTOPIA interface defines the interface of the single-stage structure in which a plurality of PHY layer devices are connected to a single ATM layer device (The ATM Forum Technical Committee "Utopia Level 2, v1.0", af-phy-0039.000, June 1995, the disclosure of which is hereby incorporated by reference).

The Level 2 UTOPIA interface describes the following three definitions regarding the number of PHY layer devices, the cell format and the signal transmit and receive operation.

According to the first definition, the number of PHY layer devices that is allowed to be connected to one ATM layer device is limited up to eight when the transmission rate of the ATM layer is equal to 155 Mbps, and is limited up to four for 622 Mbps. 16 address spaces are allowed, and the upper limit on the number of address spaces is equal to 16 in practice.

The second definition prescribes two types of cell formats, one of which is a cell format in 8-bit mode and the other is a cell format in 16-bit mode. A user defined field (UDF) in the cell formats can be open to the user.

FIGS. 4A and 4B respectively 8-bit mode and 16-bit mode cell formats in the Level 2 UTOPIA interface. As shown in FIG. 4A, the 8-bit mode cell format is made up of four headers #1–#4, the user defined area UDF and 48 payload fields #1–#48. As shown in FIG. 4B, the 16-bit mode cell format is made up of four headers #1–#4, two user defined fields #1 and #2, and 48 payload fields #1–#48. As described above, the user is free to define the user defined field UDF of the 8-bit and the user defined fields UDF#1 and UDF#2 of the 16-bit mode.

The third definition prescribes the signal transmit and receive operation between one ATM layer device and a plurality of PHY layer devices (Multi-PHY). The signal transmit and receive operation uses one transmit-cell available signal 1TxClav and one receive-cell available signal 1RxClav. The third definition allows a direct status indication and a multiplexed status polling to be arbitrarily chosen.

A description will now be given, with reference to FIGS. 5 through 8, of the transmit and receive operation with the signals 1TxClav and 1RxClav.

FIG. 5 shows connections of signal lines between one ATM layer device 17-2 and a plurality of PHY layer devices 17-1 (#1–#N). FIG. 5 illustrates an arrangement in the 8-bit mode. The signal lines between the ATM layer device 17-2 and the PHY layer devices 17-1 has a bus connection format. Signals between the ATM layer devices and the PHY layer devices are as shown in FIGS. 6A and 6B.

FIGS. 6A and 6B show signal lines of the Level 2 UTOPIA interface. More particularly, FIG. 6A shows signals used when the ATM layer device 17-2 sends cell data to the PHY layer devices 17-1. FIG. 6B shows signals used when the ATM layer device receives cell data from the PHY layer devices 17-1.

TxAddr is a five-bit address signal for selecting the PHY layer device 17-1 to which cell data is to be transferred, and is sent to the PHY layer devices 17-1 from the ATM layer device 17-2.

TxData is a transmit data signal sent to the PHY layer devices 17-1 from the ATM layer device 17-2. The TxData uses eight transmit data bus lines TxData [7:0] in the 8 bit mode, and further uses extended bus lines TxData [15:8] in the 16-bit mode.

TxSOC is a start-of-transmit-cell signal, and is sent to the PHY layer devices 17-1 from the ATM layer device 17-2. TxEnb* is a transfer enable signal for a transmit cell, and is sent to the PHY layer devices 17-1 from the ATM layer device 17-2 during a transmit cell transfer period. The symbol "*" denotes the negative logic, which holds true for signals described below.

TxFull*/TxClav is a signal indicating the state of a cell storage buffer in the PHY layer device 17-1, and is sent to the ATM layer device 17-2 from the PHY layer device 17-1.

TxFull* is a signal used when cells are sent on the octet basis, and is sent when an FIFO buffer on the octet basis is full of cells and has no available area. TxClav is a signal used when cells are sent on the cell basis, and is sent when the cell buffer has an idle area for storing a cell.

TxClk is a transmit clock signal sent from the ATM layer device 17-2 to the PHY layer devices 17-1, which perform the transmit and receive operation in synchronism with the transmit clock signal.

TxPrty is an odd parity signal for the transmit data signal TxData, and is sent to the PHY layer devices 17-1 from the ATM layer device 17-2. TxRef is a reference signal, which is sent to the PHY layer devices 17-1 from the ATM layer device 17-2.

RxAddr is a five-bit receive address signal for selecting the PHY layer device 17-1 from which cells are sent to the ATM layer device 17-2, and is sent to the ATM layer device 17-2 from the PHY layer device 17-1.

RxData is a receive data signal which the ATM layer device 17-1 receives from the PHY layer devices 17-1. The signal RxData occupies eight receive data bus lines [7:0] in the 8-bit mode, and further uses extended data bus lines RxData [15:81] in the 16-bit mode.

RxSOC is a start-of-receive-cell signal, which is sent to the ATM layer device 17-2 from the PHY layer devices 17-1. RxEnb* is a transfer enable signal for a receive cell, and is sent from the ATM layer device 17-2 to the PHY layer devices 17-1 during a cell receive period.

RxEmpty*/RxClav is a signal indicating the state of a cell send buffer in the PHY layer device 17-1, and is sent to the ATM layer device 17-2 from the PHY layer devices 17-1.

RxEmpty* is a signal used when cells are received on the octet basis, and is sent when the FIFO buffer on the octet basis is idle and there is no cell sent by the PHY layer device 17-1. RxClav is a signal used when cells are received on the cell basis, and is sent when there is a cell queued in the cell buffer.

RxClk is a receive clock signal sent to the PHY layer devices from the ATM layer device 17-2. The PHY layer devices perform the signal receive and transmit operation in synchronism with the clock signal RxClk.

RxPrty is an odd parity signal for the receive data signal RxData, and is sent to the ATM layer device 17-2 from the PHY layer devices 17-1. RxRef is a reference signal, which is sent to the ATM layer device 17-2 from the PHY layer devices 17-1.

FIG. 7 is a timing chart of the transmit operation in the Level 2 UTOPIA interface. In the transmit operation shown in FIG. 7, cell data is transferred from the ATM layer device to the PHY layer device.

Referring to FIG. 7, cells are transmitted to the Nth PHY layer device #N until the eighth rising edge of the transmit clock signal TxClk, as shown in part (h) of FIG. 7. As shown in part (f) of FIG. 7, the 42th payload P42 to the 48th payload P48 of the data signal of the cell being transmitted are sent in synchronism with the rising edges of the transmit clock signal TxClk. The Nth PHY layer device #N latches the data signal of the cell in synchronism with the rising edges of the transmit clock signal TxClk. While the data signal of the cell is being transferred, as shown in part (a) of FIG. 7, a polling operation for selecting the PHY layer device which transmits the next cell is performed.

As shown in part (c) of FIG. 7, the polling operation commences sending, as the transmit address signal TxAddr, the address of the PHY layer device which is a candidate for the next transmit destination. As shown in part (d) of FIG. 7, the PHY layer device specified by the above address signal informs, in the next clock cycle, the ATM layer device of the state of its own cell storage buffer by the signal TxClav.

Referring to parts (c) and (d) of FIG. 7, the (N−1)th PHY layer device sends out a signal indicating that the cell storage buffer is not available (this signal is set to the low level) in response to the first rising edge of the transmit clock signal TxClk (hereinafter, the first rising edge is denoted as TxClk1). The ATM layer device recognizes that the cell storage buffer of the (N−1)th PHY layer device cannot be used.

In response to TxClk2, the ATM layer device selects the address of the (N+3)th PHY layer device, which sends out, in the next clock cycle, that is, in response to TxClk3, a signal indicating that the cell storage buffer is available (the signal is switched to the high level). The ATM layer device recognizes that the cell storage buffer of the (N+3)th PHY layer device is available.

Similarly, in response to TxClk4, the ATM layer device selects the address of the (N+1)th PHY layer device, which sends out the signal that the cell storage buffer is not available in response to TxClk5. In response to TxClk6, the ATM layer device selects the address of the Nth PHY layer device, which sends out that the cell storage buffer is available in response to TxClk7.

Hence, during the period of polling, the ATM layer device recognizes that the (N+3)th and Nth PHY layer devices can queue the next cell. In part (c) of FIG. 7, 1F denotes a null address, and none of the PHY layer devices respond to the null address 1F.

When the 48th payload P48 is completely transmitted, as shown in part (e) of FIG. 7, the ATM layer device stops sending the transfer enable signal TxEnb* in response to TxClk8 (the signal TxEnb* is switched to the high level), and thus causes the PHY layer device to stop queuing the cell data. At that time, that is, in response to TxClk8, as shown in part (c) of FIG. 7, the ATM layer device sends out the address N+3 of the next destination PHY layer device.

The (N+3)th PHY layer device detects that the transfer enable signal TxEnb* is stopped in response to TxClk9 (switches to the high level) and the address signal of the (N+3)th PHY layer device is sent out as the address signal, and recognizes that cell data addressed to itself (N+3)th PHY layer device will be transmitted for the next time. Then, the (N+3)th PHY layer device latches cell data from the transmit data signal line TxData.

The PHY layer devices having the addresses other than the address sent out in response to TxClk9 do not latch the cell data from the transmit data signal line TxData. In the above-mentioned manner, the transmit destination PHY layer device is selected in response to TxClk9.

In response to TxClk9, as shown in part (e) of FIG. 7, the ATM layer device sends out the transfer enable signal TxEnb* (switches to the low level). Then, as shown in part (f) of FIG. 7, the next cell is sent out in the order of headers H1, H2, H3 and H4. Also, the signal TxSOC indicative of start of cell is sent out as shown in part (g) of FIG. 7.

The PHY layer device #N+3 thus selected queues, as cell data, the signal from the transmit data signal line TxData during the time when the transfer enable signal TxEnB* is being sent out (as long as it is at the low level). Further, during the above period, the polling is started again in synchronism with TxClk10 (which denotes the tenth rising edge of the transmit clock signal TxClk).

FIG. 8 is a time chart of the receive operation in the Level 2 UTOPIA interface. In the receive operation shown in FIG. 8, cell data is transferred to the PHY layer devices to the ATM layer device.

As shown in part (h) of FIG. 8, cell data is received from the Nth PHY layer device #N until the ninth rising edge of the receive clock signal RxClk (expressed as RxClk9). As shown in part (f) of FIG. 8, the data being received is the 41th payload P42 to the 48th payload P48 sent in synchronism with the rising edges of the receive clock signal RxClk. While the above cell data is being received, as shown in part (a) of FIG. 8, a polling operation for selecting the transmission source PHY layer device from which cell data will be received for the next time.

As shown in part (c) of FIG. 8, the polling operation commences sending, as the receive address signal RxAddr, the address of the PHY layer device which is a candidate for the next receive source from which cell will be received. As shown in part (d) of FIG. 8, the PHY layer device specified by the above address signal sends out the signal RxClav during the next clock cycle, and thus informs the ATM layer device of the state of a cell send-out buffer of the above PHY layer device.

Referring to parts (c) and (d) of FIG. 8, the (N=1)th PHY layer device sends out a signal indicating that the cell send-out buffer is not available (this signal is set to the low level) in response to the first rising edge of the receive clock signal (RxClk1). The ATM layer device recognizes that the cell send-out buffer of the (N−1)th PHY layer device cannot be used.

In response to RxClk2, the ATM layer device selects the address of the (N+3)th PHY layer device, which sends out, in the next clock cycle, that is, in response to RxClk3, a signal indicating that the cell send-out buffer is available (the signal is switched to the high level). The ATM layer device recognizes that the cell send-out buffer of the (N+3)th PHY layer device is available.

Similarly, in response to RxClk4, the ATM layer device selects the address of the (N+1)th PHY layer device, which sends out the signal that the cell storage buffer is not available in response to RxClk5. In response to RxClk6, the ATM layer device selects the address of the (N−1)th PHY layer device, which sends out that the cell send-out buffer is not available in response to RxClk7.

Hence, during the period of polling, the ATM layer device recognizes that the (N+3)th PHY layer device can send out the next cell. In part (c) of FIG. 8, 1F denotes a null address, and none of the PHY layer devices respond to the null address 1F.

When the 48th payload P48 is completely transmitted, as shown in part (e) of FIG. 8, the ATM layer device stops sending the transfer enable signal RxEnb* for the receive cell in response to TxClk8 (the signal RxEnb* is switched to the high level), and thus causes the PHY layer device to stop sending the cell data for the next clock cycle. At that time, that is, in response to RxClk8, as shown in part (c) of FIG. 8, the ATM layer device sends out the address N+3 of the next source PHY layer device.

The (N+3)th PHY layer device detects that the transfer enable signal RxEnb* for receive cell is stopped in response to RxClk9 (switches to the high level) and the address signal of the (N+3)th PHY layer device is sent out as the address signal, and recognizes that sending out of its own cell data is started. Then, the (N+3)th PHY layer device sends out cell data to the receive data signal line RxData.

The PHY layer devices having the addresses other than the address sent out in response to RxClk9 do not send cell data to the receive data signal line RxData. In the above-mentioned manner, the receive target PHY layer device is selected in response to RxClk9.

In response to RxClk9, as shown in part (e) of FIG. 8, the ATM layer device sends out the receive cell transfer enable signal RxEnb* (switches to the low level), and the PHY layer device #N+3 detects that the receive transfer enable signal RxEnb* is sent out in response to RxClk10. Then, as shown in part (f) of FIG. 8, the cell is sent out in the order of headers H1, H2, H3 and H4. Also, the signal RxSOC indicative of start of cell is switched to the high level as shown in part (g) of FIG. 8.

The PHY layer device #N+3 thus selected sends, as cell data, cell to the receive data signal line during the time when the receive cell transfer enable signal RxEnB* is being sent out (as long as it is at the low level). Further, during the above period, the polling is started again in synchronism with RxClk10 (which denotes the tenth rising edge of the receive clock signal RxClk).

Some ATM apparatuses which employ the Level 2 UTOPIA interface and is made up of a single ATM layer device and a plurality of PHY layer devices are described in U.S. Pat. No. 5,418,786 (class 370/94.2) and 5,485,456 (class 370/60). It is to be noted that the above Patents show a single-stage arrangement in which all PHY layer devices are connected to the single ATM layer device.

As described above, the Level 2 UTOPIA interface uses the 5-bit address signal, and required one of the five bits to be null. Thus, the upper limit on the number of PHY layer devices that can be connected to the ATM layer device is equal to 31. However, a large-scale access network apparatus required to accommodate a large number of subscribers is required that PHY layer devices over than the upper limit be connected to the ATM layer device.

In order to configure an ATM apparatus using PHY layer devices which conform with the Level 2 UTOPIA interface, such as an access network device capable of multiplexing and demultiplexing ATM cells, it is required to connect PHY layer devices in a multistage formation and enable a large number of PHY layer devices to be accommodated. Additionally, if a package which handles multiplexing and demultiplexing is segmented into parts of an appropriate size and such parts are connected in the multistage formation, an ATM apparatus having an appropriate scale can be constructed economically.

In a case where a plurality of PHY layer devices are connected in the multistage formation, there is only one destination when ATM cells are multiplexed and sent out towards the ATM layer device from the side of the PHY layer devices. That is, only one destination is the ATM layer network. In contrast, when cell data are distributed towards the PHY layer devices from the ATM layer device, the respective stages of the PHY layer devices are required to perform routing of cell data to respective transmit destinations.

Such routing may be accomplished as follows. The transmit address signal TxAddr output by the ATM layer device is used as routing information as it stands. The address of the PHY layer device is added to the routing information at each stage, so that the addresses of PHY devices are chained. However, the above routing cannot accommodate 32 PHY layer devices or more because only five bits of the transmit address signal TxAddr is available.

Another routing method may be used. Each PHY layer device which receives an ATM cell reads a VPI/VCI field in the cell header thereof and refers to a routing table in order to specify the routing destination. However, the above routing method requires that each PHY layer device be equipped with the routing table. This increases the circuit size. There is also another disadvantage that, if one of the routing tables is required to be modified, all of the other routing tables must be modified. This causes troublesome maintenance work.

The following documents disclose routing methods: Japanese Laid-Open Patent Application Nos. 1-190196, 1-240050, 1-289342 and 3-207140. However, the routings disclosed in the above Applications require a tag which is to be added to the head of each ATM cells, and is thus inconsistent with the routing using the address signal which conforms with the UTOPIA interface.

As to a packet routing method, an HIPPI technique is known (High-Performance Parallel Interface: see "HIPPI I-FIELD PROPOSAL", Network System Corporation (May 15th, 1990), Ideas on HIPPI I-field). According to the HIPPI, destination information named I-Field is transferred across a 32-bit data bus, and a shift operation within the I-Field is performed in each switching node. However, the above routing is not the routing using the address signal defined by the UTOPIA interface.

SUMMARY OF THE INVENTION

It is a general object of the present invention to provide an ATM apparatus in which the above disadvantages are eliminated.

A more specific object of the present invention is to provide an ATM apparatus capable of multiplexing and demultiplexing a large number of ATM cells by using an address signal consistent with the UTOPIA interface and making it possible for each PHY layer device to have a simple routing process part.

The above objects of the present invention are achieved by an ATM apparatus comprising: an ATM device; and a plurality of devices arranged in a multistage formation in which the ATM device is located at a top of the multistage structure, the ATM device and the plurality of devices employing a given interface using an address signal and a control signal, and transferring routing information including address information on at least one of the devices by using the address signal and a data signal written into a given field of an ATM cell. Hence, a large number of devices such as PHY layer devices can be accommodated in the ATM apparatus.

The above ATM apparatus may be configured so that: the ATM device is equipped with a routing table in which the routing information is stored with regard to a value of a VPI/VCI field provided in a header of the ATM cell; and the devices arranged in the multistage formation extract the routing information using the address signal and the data signal in the given field of the ATM cell, and performs routing based on extracted routing information. The routing table is provided in the ATM device only. Hence, routing can be made with a simple structure. In addition, the maintenance work about routing can be done with ease. Further, the devices such as PHY layer devices are not required to have any table for routing.

The ATM apparatus may be configured so that the devices arranged in the multistage formation generates new routing information by a bit shift operation on the extracted routing information, and transfers the new routing information to another device of a lower stage. Hence, the routing information can be updated automatically and transferred to devices of the lower level without any difficulty.

The ATM apparatus may be configured so that the address signal and the data signal form a routing information field in which arbitrary information other than the routing information can be stored. Hence, desired information can easily be transferred to another device.

The ATM apparatus may be configured so that: the address signal and the data signal form a routing information field; the ATM device writes information on multicasting into the routing information field and transfers the information concerning multicasting to the devices of the lower stage; and each of the devices that receives the information concerning makes a copy of the ATM cell received and performs multicasting. Hence, multicasting can be accomplished with reduced traffic.

The ATM apparatus may be configured so that the address signal and the data signal form a routing information field in which arbitrary information other than the routing information can be stored, the arbitrary information being transferred between the ATM device and the devices of the lowermost stage of the multistage formation. Hence desired information can be transferred to another device with ease.

The ATM apparatus may be configured so that the given interface is a Level 2 UTOPIA interface. In this case, the given field is a user defined field of the Level 2 UTOPIA interface. Further, the ATM device is an ATM layer device of the Level 2 UTOPIA interface, and the devices arranged in the multistage formation are respectively physical layer devices of the Level 2 UTOPIA interface.

Another object of the present invention is to provide an ATM device applicable to an ATM apparatus including a plurality of devices arranged in a multistage formation in which the ATM device is located at a top of the multistage structure, wherein the ATM device and the plurality of devices employ a given interface using an address signal and a control signal, The ATM device comprises: an ATM switch which switches an ATM cell; and a routing table that stores routing information with regard to a value of a VPI/VCI field provided in a header of the ATM cell, the routing information including address information concerning at least one of the devices by using the address signal and a data signal written into a given field of the ATM cell.

BRIEF DESCRIPTION OF THE DRAWINGS

Other objects, features and advantages of the present invention will become more apparent from the following detailed description when read in conjunction with the accompanying drawings, in which:

FIGS. 4A and 4B show a cell format in the Level 2 UTOPIA interface;

FIGS. 6A and 6B explain the signal lines in the Level 2 UTOPIA interface;

DESCRIPTION OF THE PREFERRED EMBODIMENTS

Figure 9:
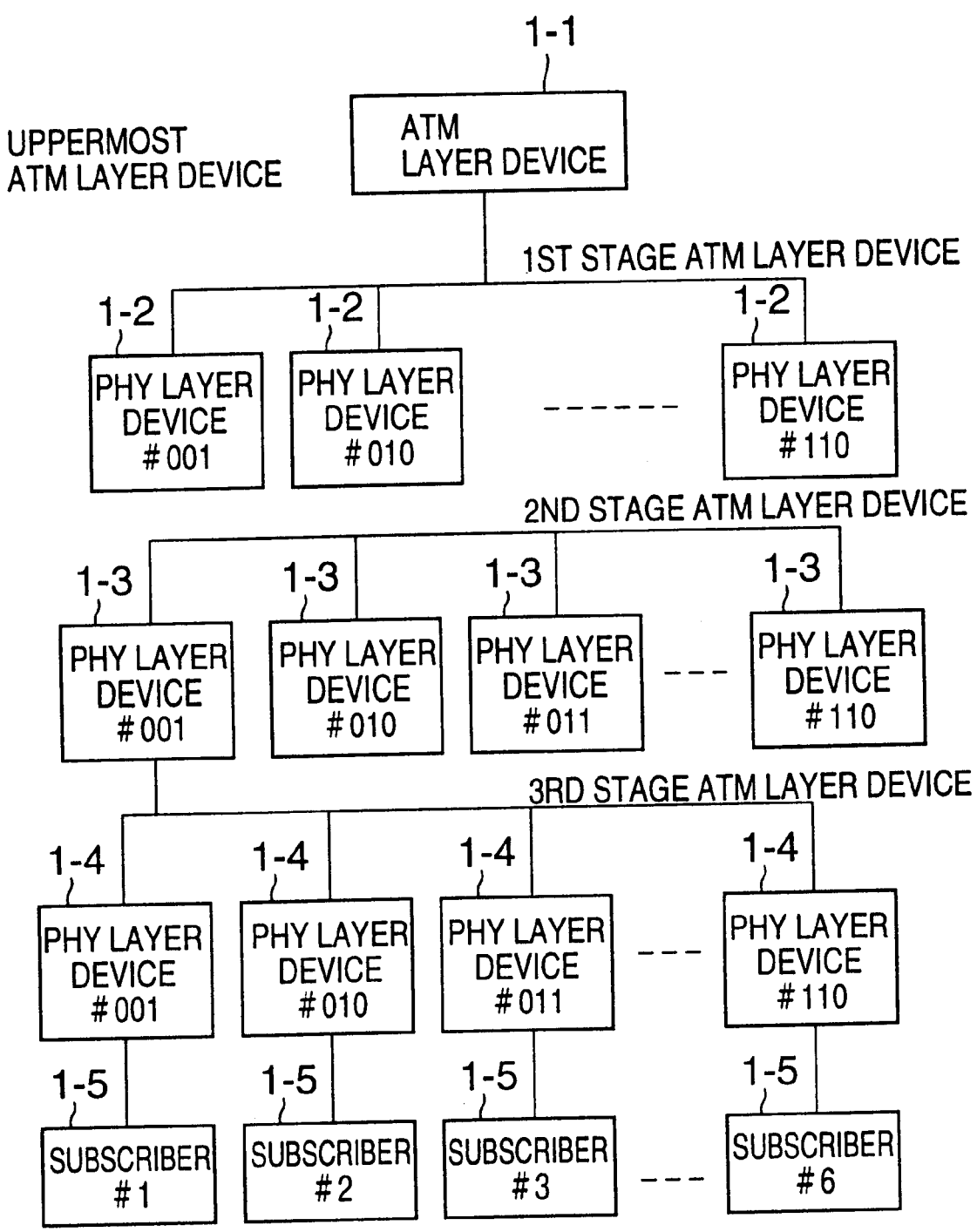
FIG. 9 is a block diagram of an ATM apparatus having a multistage connection formation according to an embodiment of the present invention.

FIG. 9 is a block diagram of an ATM apparatus having a multistage connection formation according to an embodiment of the present invention. The ATM apparatus shown in FIG. 9 includes an ATM layer device 1-1, PHY layer devices 1-2 of the first stage, PHY layer devices 1-3 of the second stage, PHY layer devices 1-4 of the third stage, and subscriber terminals 1-5 of the fourth stage.

The ATM layer device 1-1 is located at the uppermost stage, and more particularly corresponds to an ATM switch (a switch chip). The PHY layer stages 1-2, 1-3 and 1-4 located at lower stages correspond to cell multiplexing/demultiplexing devices. The subscriber terminals 1-5 are accommodated by the PHY layer devices 1-4 of the lowermost stage.

The PHY layer devices 1-2, 1-3 and 1-4 of the first, second and third stages are coupled with the ATM layer device 1-1 through the Level 2 UTOPIA interface. As has been described previously, the Level 2 UTOPIA interface defines the transmit address signal TxAddr consisting of 5 bits and the receive address signal RxAddr consisting of 5 bits.

With the above in mind, the present embodiment of the invention utilizes, as routing information concerning routing in each PHY layer device, a combination of 5 bits of the address signal and the user defined field (UDF) in the header of the cell format consistent with the UTOPIA interface. Hence, routing with regard to a large number of PHY layer devices can be realized. Hereinafter, a field of the combination of the address signal (TxAddr or RxAddr) and the user defined area (UDF) will be referred to as a routing information area. interface. Hence, routing with regard to a large number of PHY layer devices can be realized. Hereinafter, a field of the combination of the address signal (TrAddr or RxAddr) and the user defined area (UDF) will referred to as a routing information area.

The ATM layer device 1-1 of the uppermost stage is equipped with a routing table, and generates, based on the VPI/VCI field in the cell header, items of address information respectively concerning PHY layer devices up to the cell data transmit destination. Then, the ATM layer device 1-1 chains the items of address information and writes chained address information in the above-mentioned routing information field. Then, the cell data is transferred to the PHY layer device of the lower (first) stage through the Level 2 UTOPIA interface.

The PHY layer device in each stage latches cell data by referring to the address described in the routing information field, and transfers the latched cell data to the PHY layer device of the just lower stage while shifting the routing information.

Only the ATM layer device of the uppermost stage in the tree structure is equipped with the routing table and refers to the VPI/JVCI field in the cell header. In contrast, the PHY layer devices of the lower stages are not equipped with routing tables and do not refer to the VPI/FVCI field of the cell header but perform routing based on only the address information described in the routing information field.

Figure 10:
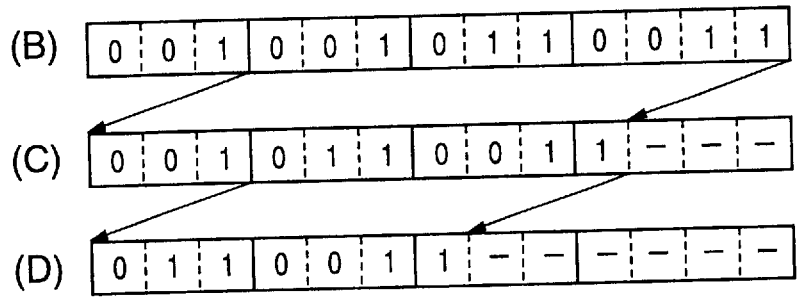
FIG. 10 shows a routing table and a routing information field used in an embodiment of the present invention.

FIG. 10 shows an example of the routing table and an example of the routing information field employed in the present embodiment. More particularly, part (A) of FIG. 10 shows a routing table used in the 8-bit mode. The routing table shown in part (A) of FIG. 10 is equipped with a routing information field which stores, with respect to the value of the VPI/VCI field of the cell header, routing information which includes chained address information concerning up to the destination (that is, the destination PHY layer device and intervening PHY devices).

The uppermost-stage ATM layer device refers to the routing table, and reads, from the value of the VPI/VCI field of the cell header, the corresponding routing information. For example, referring to part (A) of FIG. 10, the ATM layer device reads, from the value of the VPI/VCI field with regard to subscriber #3 '00000001/00000000 00001010', the address of the PHY layer device '00100 10110011'.

Then, the uppermost ATM layer device writes the first 5 bits of the routing information into the transmit address signal TxAddr, and writes the remaining 8 bits thereof into the user defined field UDF. Then, the uppermost ATM layer device sends out the cell data including such routing information to the first-stage PHY layer devices 1-2. Part (B) of FIG. 10 indicates routing information sent out by the uppermost ATM layer device 11-1.

By the three upper bits '001' of the address shown in part (B) shown in FIG. 10, PHY layer device #001 of the first stage is selected. Then, PHY layer device #001 of the first stage extracts the routing information from the address signal TxAddr and the user defined field UDF, and shifts leftwards the address information by three bits, as shown in part (C) of FIG. 10. The resultant address information obtained by the three-bit leftward shift operation is output to the PHY layer devices of the second stage.

By the three upper bits '001' of the address shown in part (C) of FIG. 10, PHY layer device #001 of the second stage is selected. Then, PHY layer device #001 shifts leftwards the address information by three bits, as shown in part (D) of FIG. 10. The resultant address information thus obtained is output to the PHY layer devices of the third stage.

By the three upper bits '011' of the address shown in part (D) of FIG. 10, PHY layer device #011 of the third stage is selected. Then, cell data is sent from PHY layer device #011 to subscriber terminal #3.

In the above-mentioned case, the remaining four bits '0011' are not used but can be used to transfer other control or auxiliary information (such as port numbers of the lowermost PHY device) to be sent to the lowermost devices from the uppermost ATM layer device.

An operation similar to the above can be carried out in order to send information from the PHY layer device to the uppermost ATM layer device. For example, part (E) of FIG. 10 shows an example of the content of the routing information field in receive operation, and more particularly shows that an ATM cell having identical routing information '1100000000000' is sent out with regard to subscribers #1–#3.

At the time of multicasting, the uppermost ATM layer device 1-1 writes information indicative of multicasting into the routing information field, which is sent to the PHY layer devices of the stages. Each of the PHY layer devices receives the information indicative of multicasting and thus make a copy of the ATM cell. Hence the traffic (the number of cells passing) of the uppermost ATM layer device can be reduced and efficient multicasting can be realized.

Figure 11:
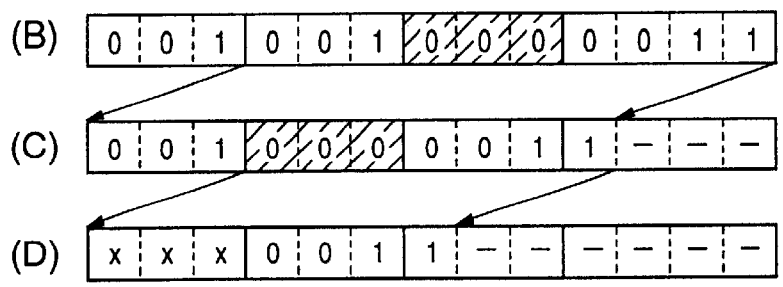
FIG. 11 shows a routing table and a routing information field used at the time of multicasting according to the embodiment of the present invention.

FIG. 11 shows an example of the routing table and an example of the routing table information field at the time of multicasting according to the present embodiment. More particularly, part (A) of FIG. 11 shows an example of the routing table at the time of multicasting, in which '000' shaded with slant lines is information indicative of multicasting. Part (B) of FIG. 11 shows routing information output by the uppermost ATM layer device, and part (C) thereof shows routing information output by the PHY layer device 1-1 of the first stage. Further, part (D) of FIG. 11 shows routing information output by the PHY layer devices 1-3 of the second stage.

As shown in parts (B)–(D) of FIG. 11, the routing information is transferred towards the PHY layer devices of the stages while being shifted leftwards at each stage. The PHY layer devices of the lowest stage involved with multicasting write 'xxx' in the three upper bits of the routing information, and writes the addresses of the PHY layer devices of the immediately lower stage in the field. Then, a copy of the ATM cell is made, and the identical contents of the ATM cell are sent to the PHY devices of the lower stage. In the above manner, multicasting is performed.

Part (E) of FIG. 11 shows an example of the contents of the routing information field of the receive operation at the time of multicasting. The uppermost-stage ATM layer device receives routing information '1100000000000' inserted into the routing information field, the above routing information being originated from the cell transmit source PHY layer device.

Figure 1:
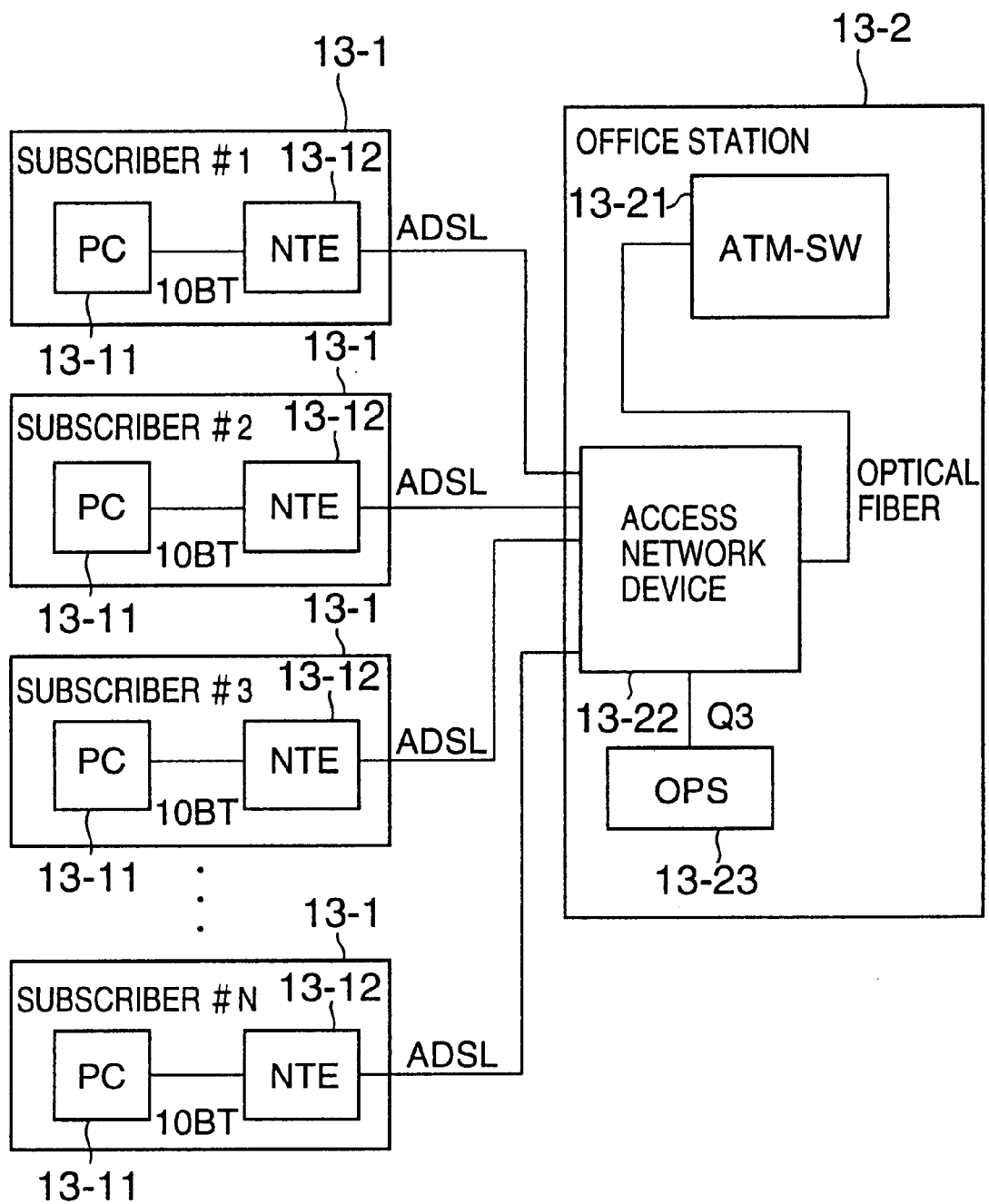
FIG. 1 a block diagram of a network system equipped with an ATM apparatus capable of multiplexing and demultiplexing ATM cells.
Figure 2:
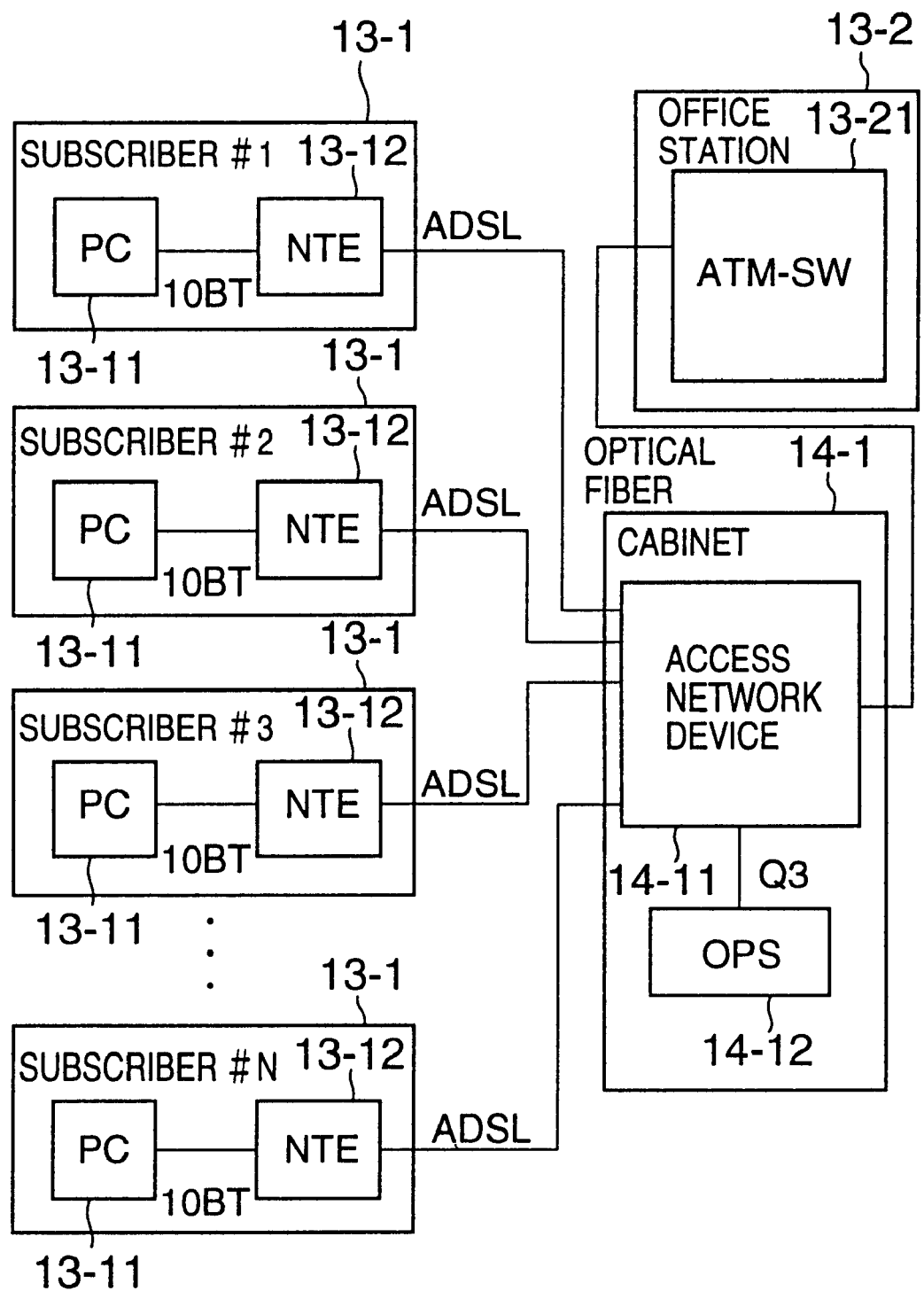
FIG. 2 is a block diagram of another network system equipped with an ATM apparatus capable of multiplexing and demultiplexing ATM cells.
Figure 3:
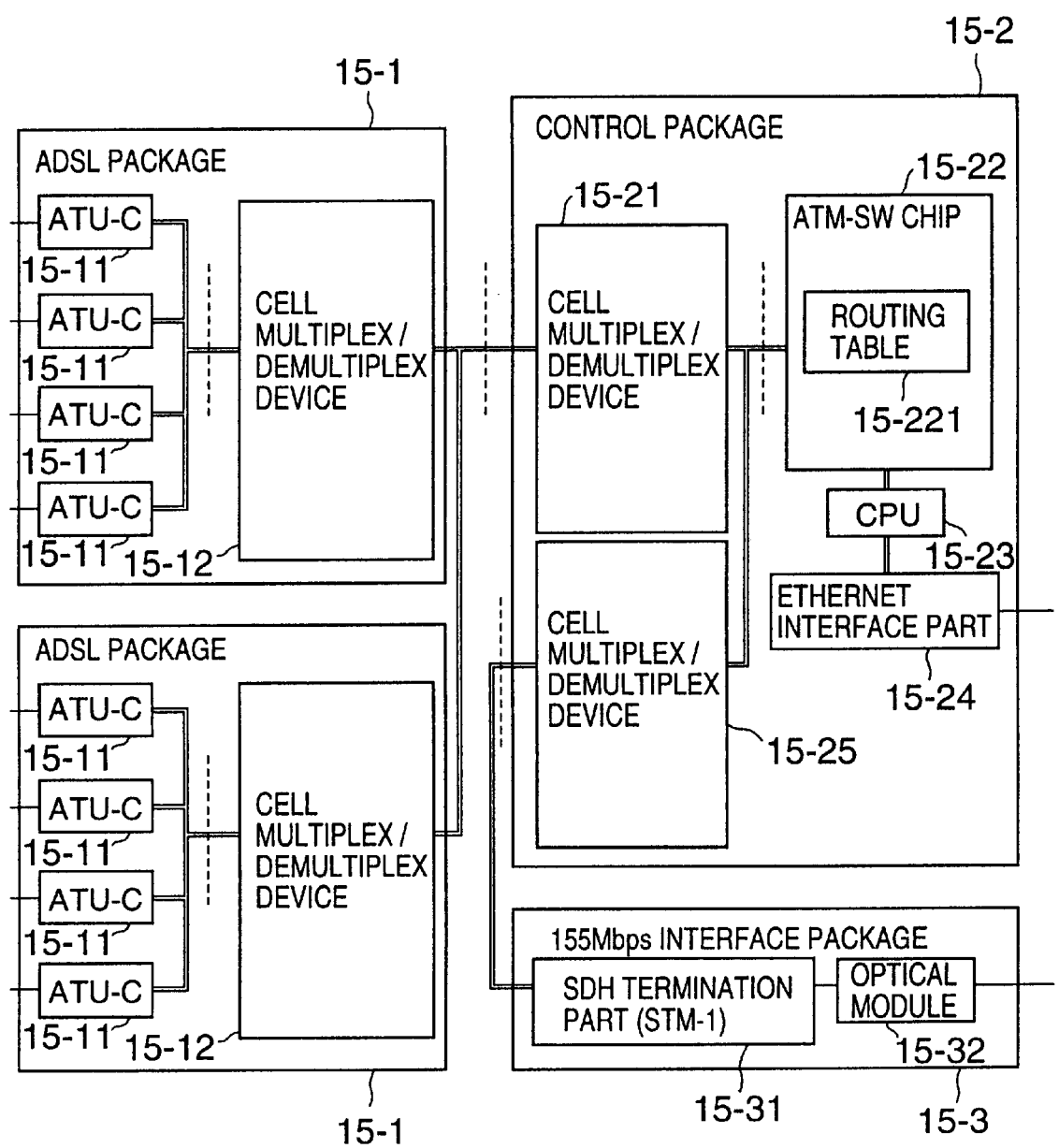
FIG. 3 is a block diagram of a structure of an access network device.
Figure 5:
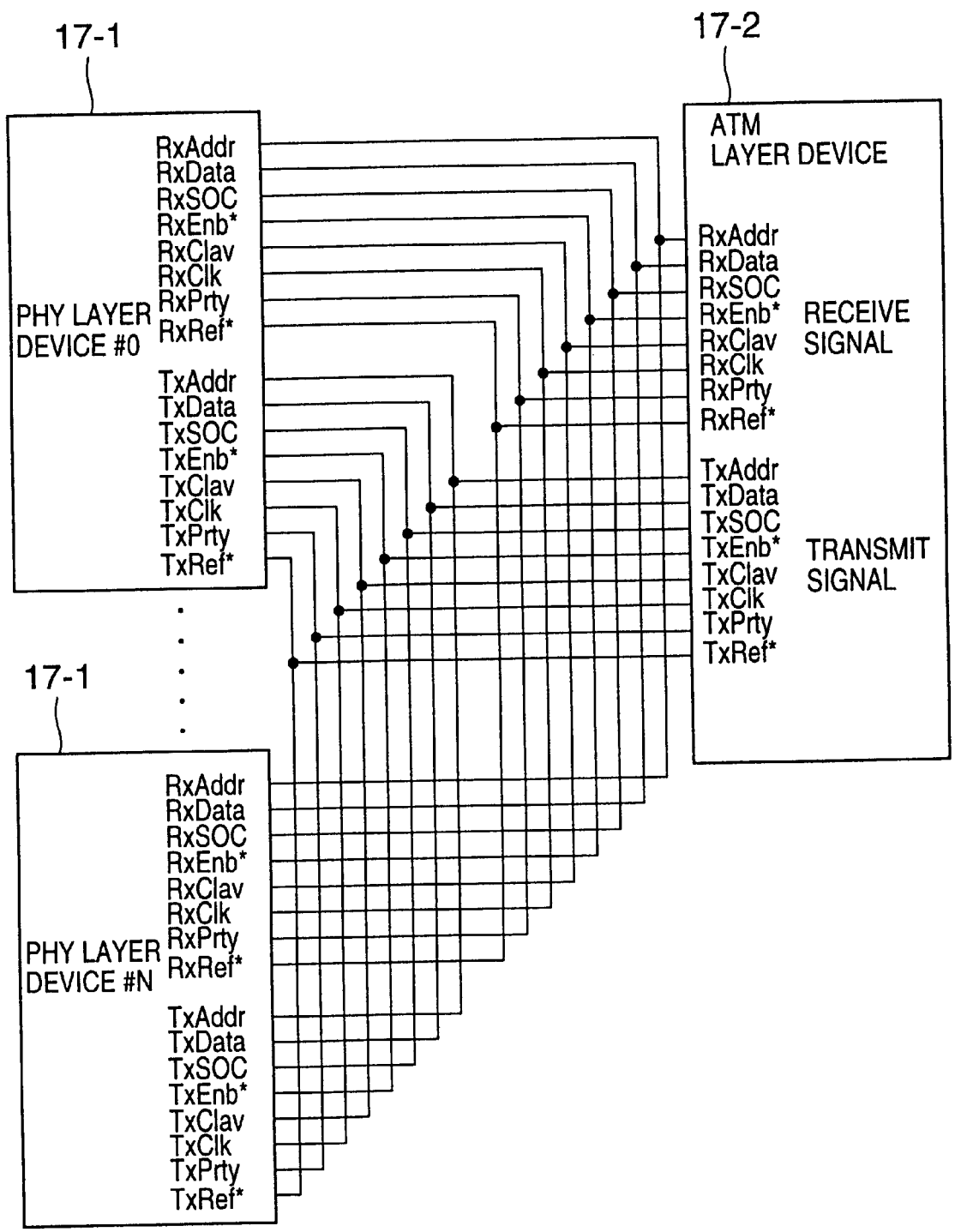
FIG. 5 is a diagram showing signal lines connecting an ATM layer device and a plurality of PHY layer devices.

A description will be given, with reference to FIG. 3, of an access network device to which the ATM device of the above embodiment of the present invention is applied. A data signal transferred over an optical fiber from an ATM network such as an ATM switch is received by the optical module 15-32 of the 155 Mbps interface package 15-3. Then, an SDH transfer signal of STM-1 format or the like is terminated by the SDH terminating part 15-31, and is transferred, through the Level 2 UTOPIA interface, to the ATM switch chip 15-22 via the cell multiplexing/demultiplexing device 15-25 (which is the uppermost-stage ATM layer device).

The ATM switch chip 15-22 recognizes the value of the VPI/VCI field in each ATM cell, and refers to the routing table 15-221. Then, the ATM switch chip 15-22 retrieves routing information corresponding to the value of the VPI/VCI from the routing table 15-221. Then, the ATM switch chip 15-22 sets the five upper bits of the routing information to the transmit address signal TxAddr, and writes the eight remaining bits of the routing information into the user defined field UDF of the ATM cell header. Then, the ATM cell with the routing information field is transferred to the cell multiplexing/demultiplexing devices 15-21 and 15-12 of the lower stage.

A description will be given of a method for setting the routing table. There are two quite different types of setting the routing table respectively associated with a permanent virtual channel (PVC) and a switched virtual channel (SVC).

Figure 12:
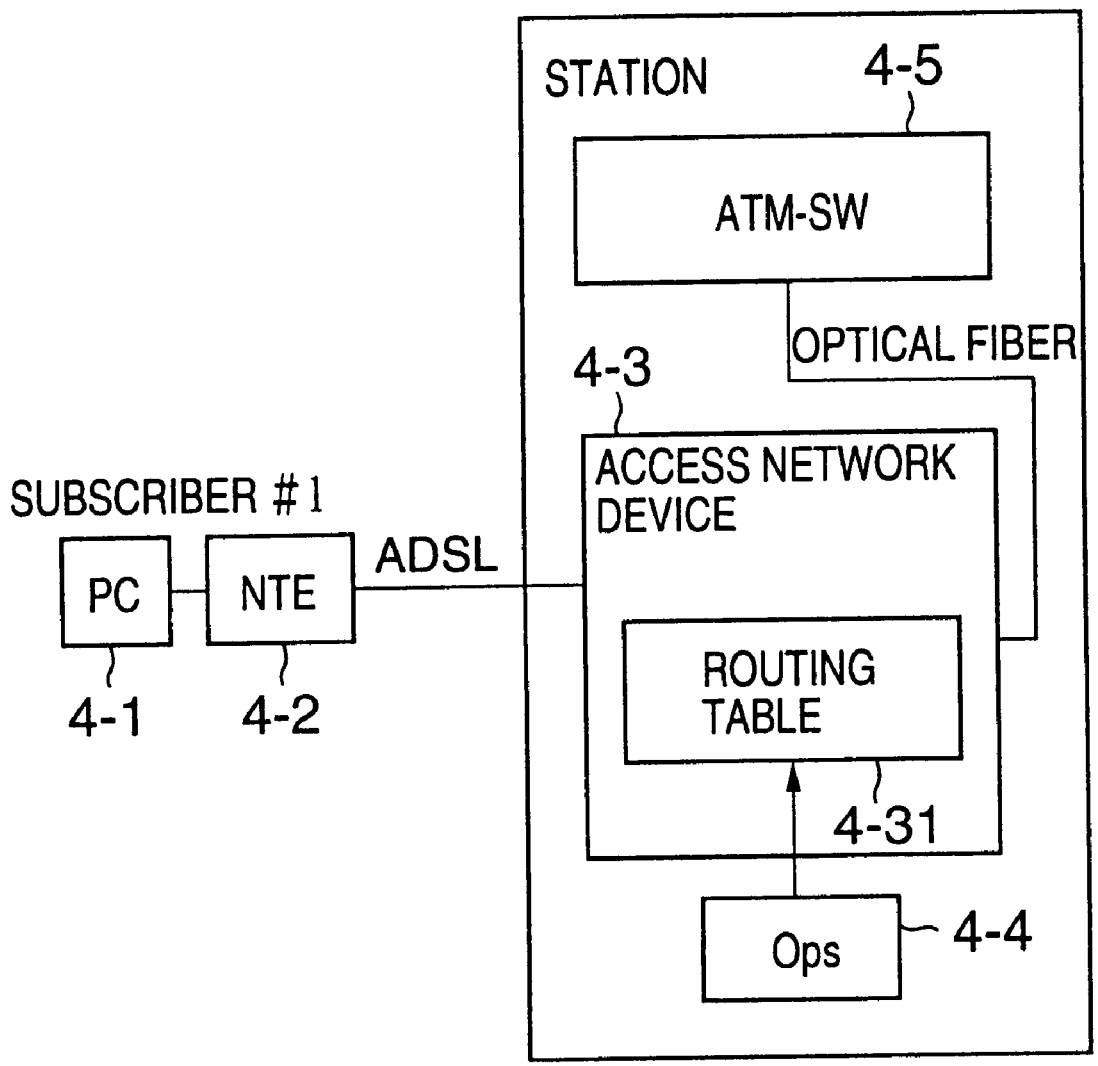
FIG. 12 is a diagram of a method for setting a routing table performed when a permanent virtual channel is used.

FIG. 12 shows a routing table setting method associated with the permanent virtual channel. FIG. 12 shows a terminal device 4-1 in subscriber home #1, a network termination equipment 4-2, an access network device 4-3 installed in an office station, a routing table 4-31, an operating system part (Ops) 4-4, and an ATM switch device 4-5.

A permanent virtual channel (PVC) is assigned to the terminal device 4-1 of subscriber home #1. Routing information concerning the PHY layer device which accommodates the terminal device 4-1 of subscriber home #1 is written into the routing table 4-31 under the control of the operating system part 4-4. The setting of the routing table 4-31 of the access network device 4-3 can be performed by a CMIP operation via a LAN from a workstation.

Figure 13:
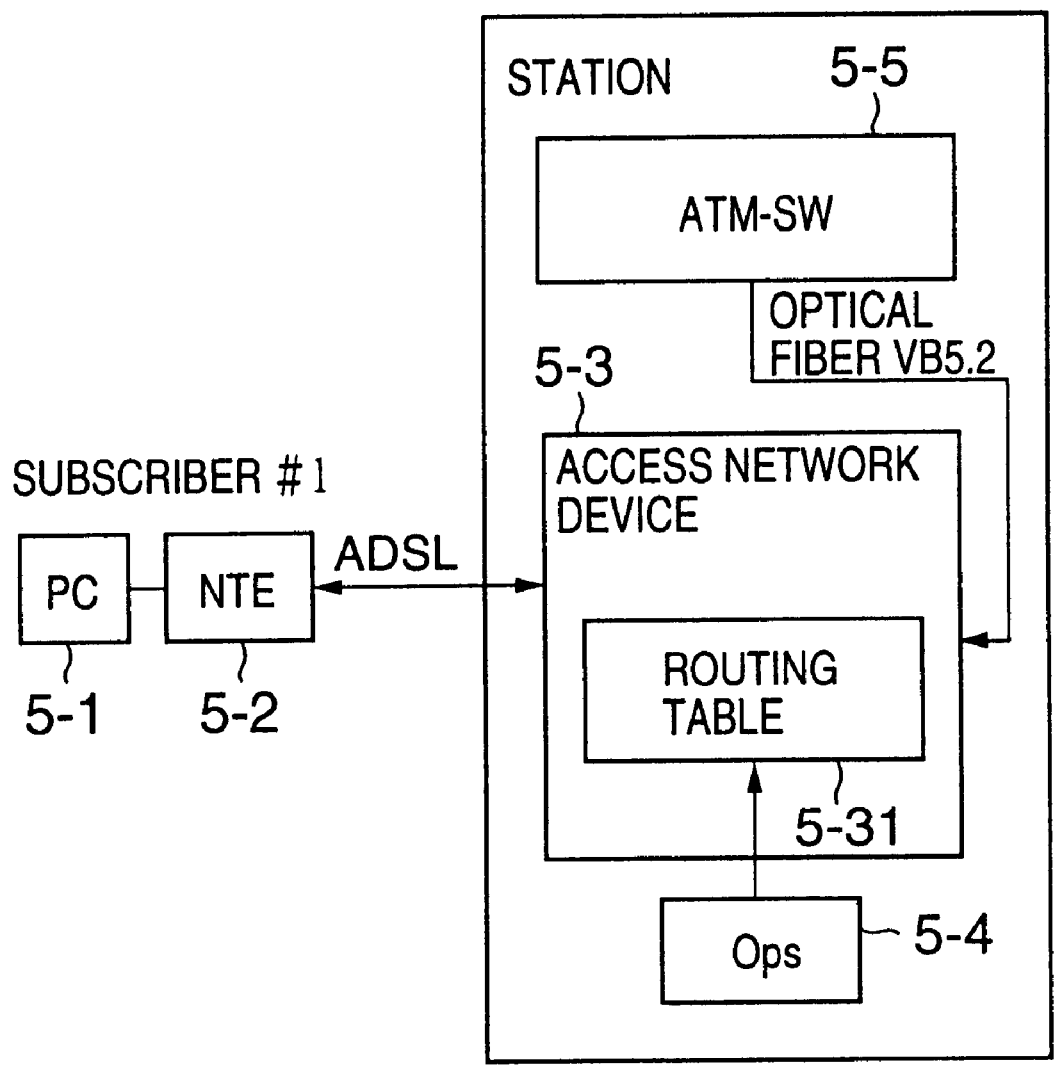
FIG. 13 is a diagram of a method for setting a routing table performed when a switched virtual channel is used.

FIG. 13 shows a routing table setting method associated with the switched virtual channel (SVC). FIG. 13 shows a terminal device 5-1 in subscriber home #1, a network termination equipment 5-2, an access network device 5-3 installed in an office station, a routing table 5-31, an operating system part (Ops) 5-4, and an ATM switch device 5-5.

The switched virtual channel is not permanently assigned as in the case of the permanent virtual channel, but is newly assigned each time a call from a subscriber is issued.

A call from a subscriber is assigned a switched virtual channel selected from among idle virtual channels in the following manner each time a call is issued. Signals are transferred between the network terminating equipment (NTE) 5-2 in the subscriber house and the ATM switch 5-5 through a given interface such as a signaling protocol UNI Signaling 4.0. Further, signals are transferred between the access network device 5-3 and the ATM switch 5-5 through a given interface such as a VB5.2 interface.

Figure 14:
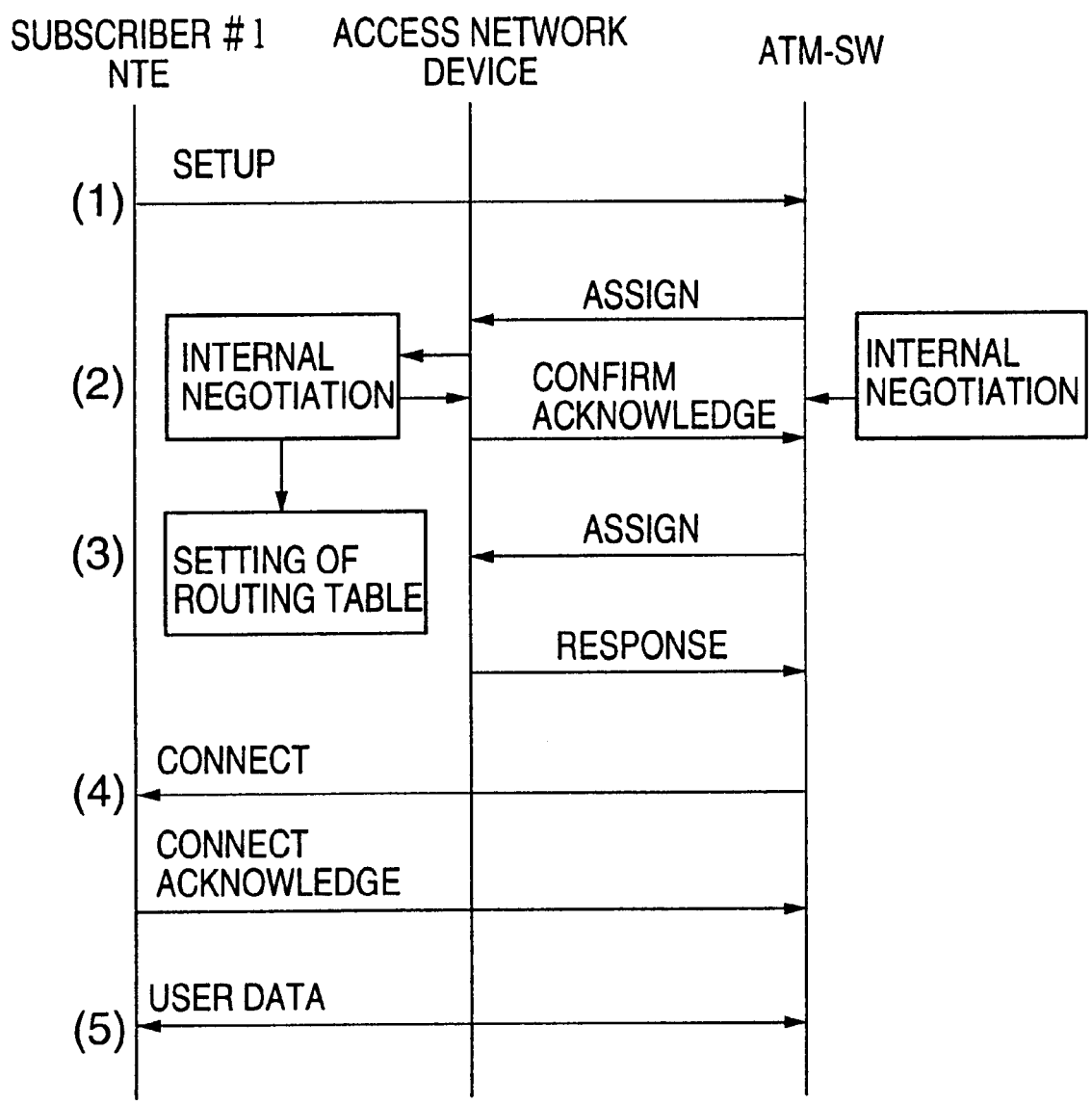
FIG. 14 is a sequence chart of setting the routing table with the permanent virtual channel employed.

FIG. 14 is a sequence chart of setting the routine table associated with the switched virtual channel. First, at step (1), the network termination equipment 5-2 of the subscriber house issues a setup request for virtual channel against the ATM switch 5-5 in accordance with the signalling protocol. Then, at step (3), the ATM switch 5-5 and the access network device 5-3 mutually confirm that there is no problem about assignment of a virtual channel by using a B-BCC message.

At step (3), the access network device 5-3 performs a connection admission control (CAC), and performs setting of the routing table which shows the correspondence between the virtual channel assigned to the subscriber and the routing information concerning the PHY layer device which accommodates the above subscriber.

At step (4), a path is set up by transferring commands such as a connect command and a connect acknowledge commands after the routing table is set up. Thus, data can be transferred between the subscriber and the terminal device at step (5).

Figure 15:
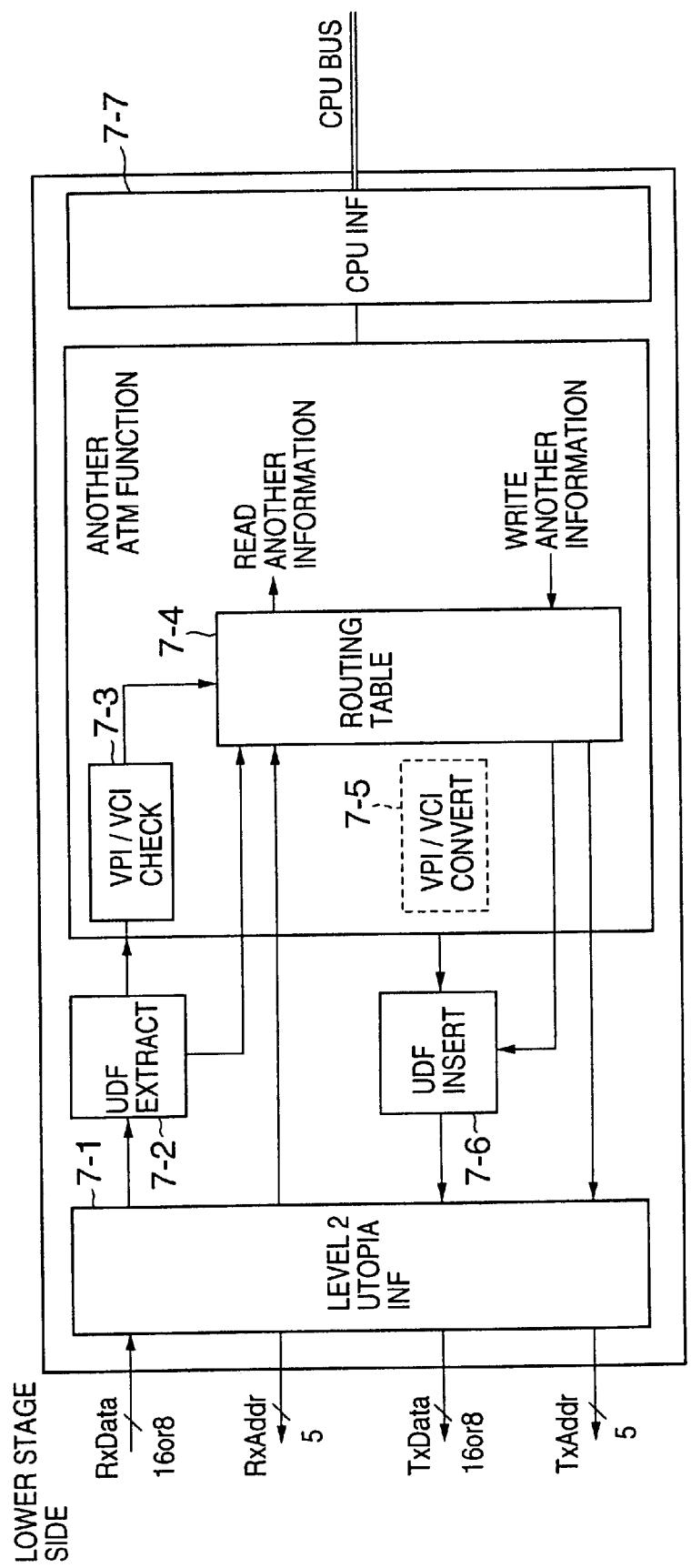
FIG. 15 is a block diagram of a structure of an ATM layer device located at the uppermost stage in multistage formation.

FIG. 15 is a block diagram of a structure of the uppermost-stage ATM layer device, which is, for example, an ATM switch chip. The uppermost-stage ATM layer device includes a Level 2 UTOPIA interface part 7-1, a user defined field (UDF) extracting part 7-2, a VPI/VCI check part 7-3, a routing table 7-4, a VPI/VCI converting part 7-5, a user defined field (UDF) inserting part 7-6, and a CPU interface part 7-7.

When an ATM cell is received from the receive data signal line RxData via the Level 2 UTOPIA interface part 7-1, the user defined field extracting part 7-2 extracts the user defined field UDF, and extracts the routing information from the receive address signal RxAddr and the user defined field UDF.

The routing information may include other information transferred from a PHY layer device of a lower stage in addition to the routing information. The information included in the routing information can be read from the value of the VPC/VCI extracted by the VPI/VCI check part 7-3.

With regard to an ATM cell received from the CPU bus via the CPU interface part 7-7, the VPI/VCI converting part 7-5 outputs a converted value of the VPI/VCI as necessary. Then, the routing information is extracted from the ATM cell by referring to the routing table 7-4 using the value of the VPI/VCI. Then, the five upper bits of the routing information is output via the Level 2 UTOPIA interface part 7-1 as the transmit address signal TxAddr. The remaining bits of the routing information are written into the user defined field UDF of the ATM cell header by the user defined field inserting part 7-6. Then, the data of the ATM cell of interest is output to the transmit data signal line TxData via the Level 2 UTOPIA interface part 7-1.

Figure 16:
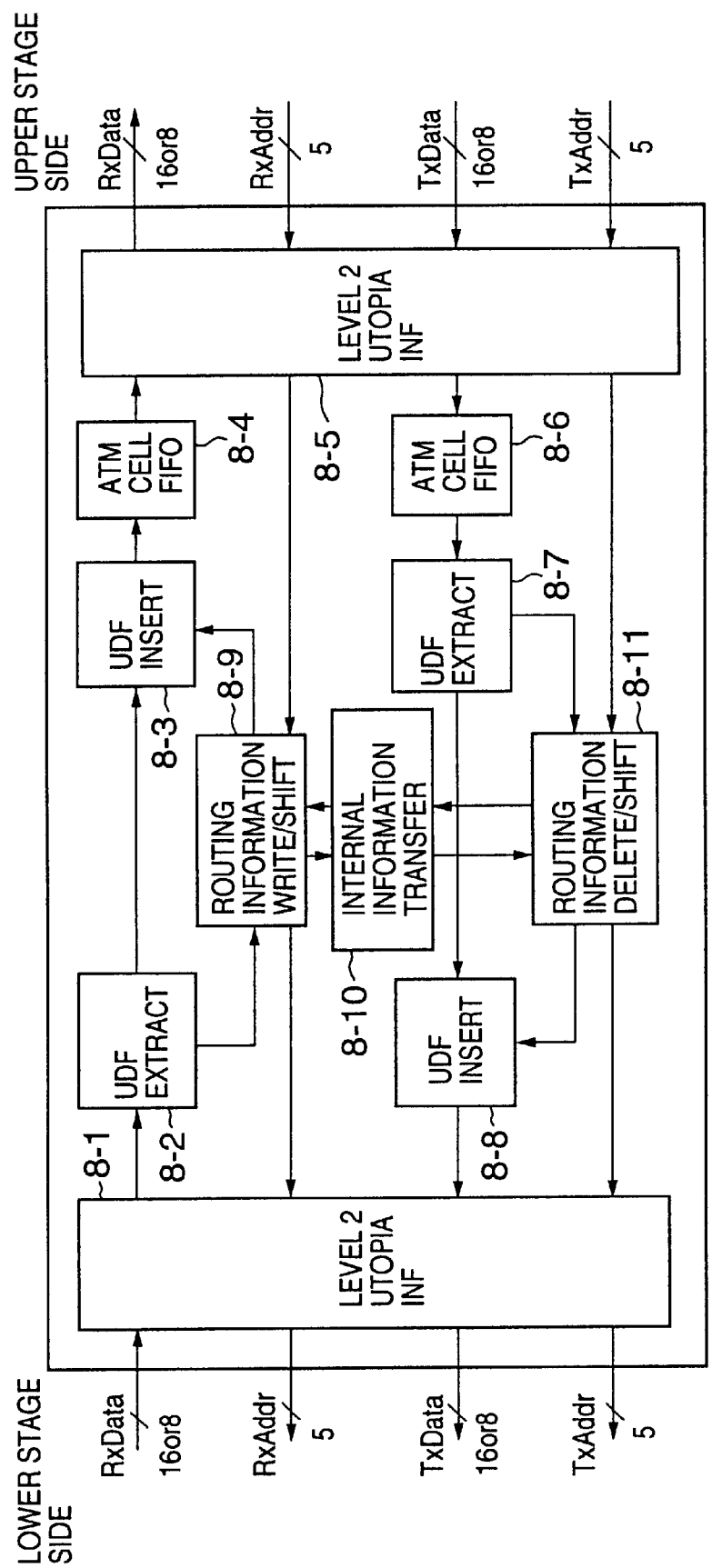
FIG. 16 is a block diagram of a PHY layer device located at an intermediate stage in the multistage formation.
Figure 17:
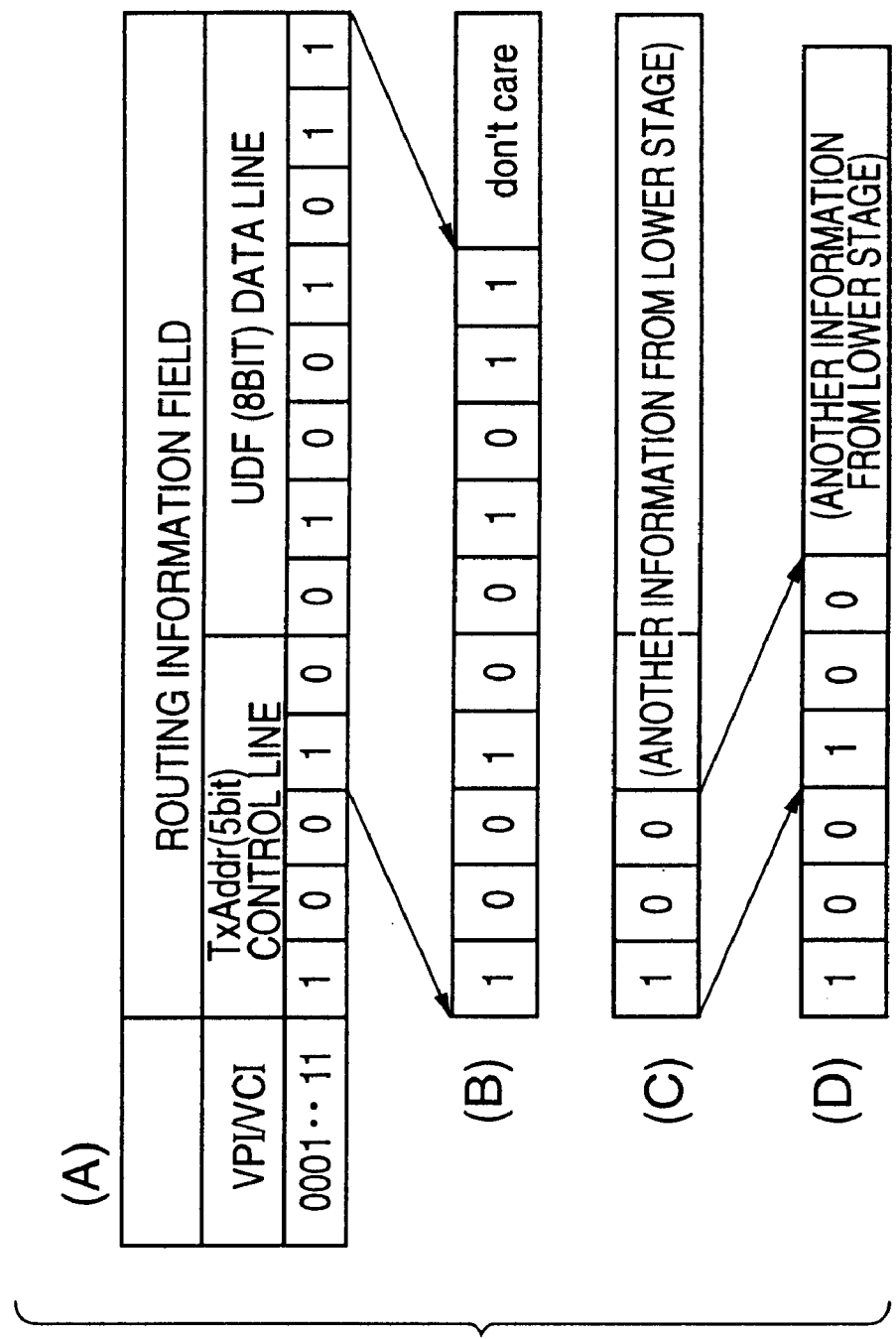
FIG. 17 shows a shift operation on a routing information field in a PHY layer device at an intermediate stage.

FIG. 16 is a block diagram of a structure of the PHY layer devices located at the intermediate stages between the uppermost stage and the lowermost stage. FIG. 17 shows a shift operation on the routing information field in the PHY layer devices of the intermediate stages. When an ATM cell is received from the upper stage, each PHY layer device reproduces the routing information and transfers the ATM cell to the lower stage.

The PHY layer device shown in FIG. 16 includes a Level 2 UTOPIA interface part 8-1 related to devices of the lower stage, a user defined field extracting part 8-2 involved with receive operation, a user defined field inserting part 8-3 involved with receive operation, an ATM cell FIFO buffer 8-4 involved with receive operation. Further, the PHY layer device shown in FIG. 16 includes a Level 2 UTOPIA interface part 8-5 related to device of the upper stage, an ATM cell FIFO buffer 8-6 involved with transmit operation, a user defined field extracting part 8-7 involved with transmit operation, a user defined field inserting part 8-8 involved with transmit operation, a routing information write shift part 8-9, an internal information transfer part 8-10, and a routing information delete and shift part 8-11.

The transmit address that is input from the transmit address signal line TxAddr via the Level 2 UTOPIA interface part 8-5 of the upper stage is input to the routing information delete and shift part 8-11. Further, the ATM cell data that is input from the transmit data signal line TxData is held in the ATM cell FIFO buffer 8-6 involved with transmit operation. Then, the routing information is extracted from the user defined field extracting part 8-7 involved with transmit operation, and is applied to the routing information delete and shift part 8-11.

As shown in parts (A) and (B) of FIG. 9, the routing information delete and shift part 8-11 deletes and discards only three upper bits of the routing information used for routing at the upper stage, and shifts the remaining bits towards the upper side by three bits. Then, the part 8-11 sends out the five upper bits of the shifted routing information to the PHY layer devices of the lower stage via the Level 2 UTOPIA interface part 8-1 connected to the lower stage and the transmit address signal line TxAddr. Further, the part 8-11 outputs the remaining bits of the routing information to the user defined field inserting part 8-8 involved with transmit operation. Then, the user defined field inserting part 8-8 inserts the above routing information into the user defined field UDF of the ATM cell header, which is then sent to the PHY layer device of the lower stage via the Level 2 UTOPIA interface part 8-1 connected to the lower stage and the transmit data signal line TxData.

When an ATM cell is received from a PHY device of the lower stage via the Level 2 UTOPIA interface part 8-1, the routing information is reproduced as shown in parts (C) and (D) of FIG. 17 by the user defined field extracting part 8-2 involved with receive operation, the routing information write shift part 8-9 and the user defined field inserting part 8-3 involved with receive operation. Then, the ATM cell is transferred to the PHY layer device of the upper stage via the ATM cell FIFO buffer 8-4 involved with receive operation and the Level 2 UTOPIA interface part 8-5 connected to the upper stage.

Further, internal information concerning signals involved with receive operation and those involved with transmit operation are mutually transferred between the routing information write shift part 8-9 and the routing information delete and shift part 8-11 and are extracted under the control of the internal information transfer part 8-10.

Figure 18:
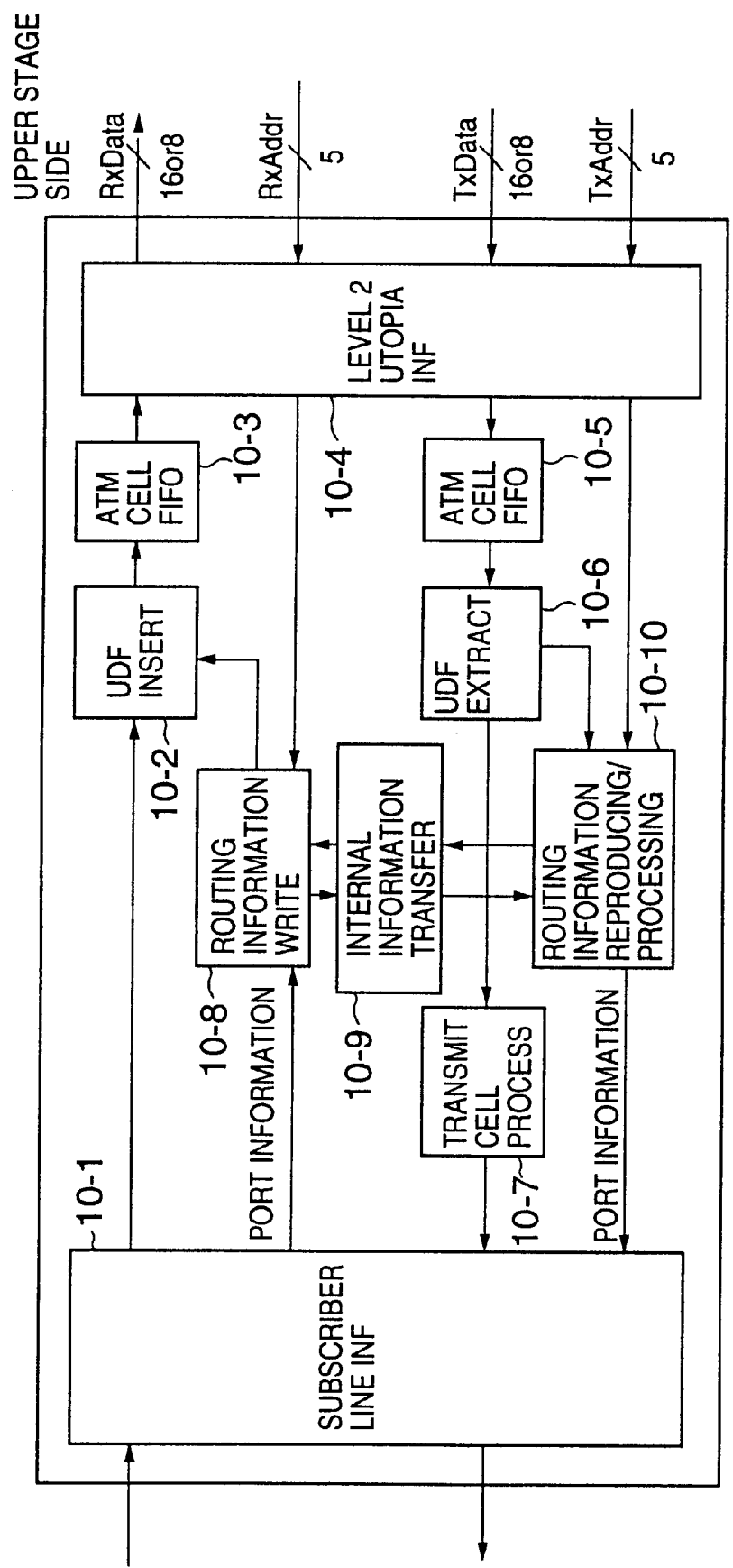
FIG. 18 is a block diagram of a PHY layer device located at the lowermost stage in the multistage formation.

FIG. 18 is a block diagram of a structure of the PHY layer devices of the lowermost stage. The PHY layer devices include a subscriber line interface part 10-1, a user defined filed inserting part 10-2, an ATM cell FIFO buffer 10-3 involved with receive operation, a Level 2 UTOPIA interface part 10-4 connected to the upper stage, an ATM cell FIFO buffer 10-5 involved with transmit operation, a user defined field extracting part 10-6, a transmit cell processing part 10-7, a routing information writing part 19-8, an internal information transfer part 10-9 and a routing information reproducing and processing part 10-10.

In each of the PHY layer devices of the lowermost stage, an ATM cell received via the Level 2 UTOPIA interface part 10-4 connected to the upper stage is temporarily stored in the ATM cell FIFO buffer 10-5 involved with transmit operation. Then, the routing information is extracted from the ATM cell by the user defined field extracting part 10-6, and the extracted routing information is applied to the routing information reproducing and processing part 10-10.

The address received via the transmit address signal line TxAddr is input to the routing information reproducing and processing part 10-10, which reproduces and process the routing information on the basis of the received information. Then, the part 10-10 discards only the bits used in the upper stage, and the remaining information such as port information is sent out to the subscriber line interface part 10-1. Further, the part 10-10 makes error control information stored in the user defined field UDF and sends out the ATM cell including the above field UDF to the subscriber line interface part 10-1.

In the PHY layer devices, all of the remaining bits in the information fields can be used to inform other devices of arbitrary information and can be used as, for examples, port information.

Information to be transferred to the upper stage is written into the user defined field by means of the routing information writing part 10-8 and the user defined field inserting part 10-2. Then, the information is sent out to the PHY layer device of the upper stage via the ATM cell FIFO buffer 10-3 involved with receive operation and the Level 2 UTOPIA interface part 10-4.

Figure 7:
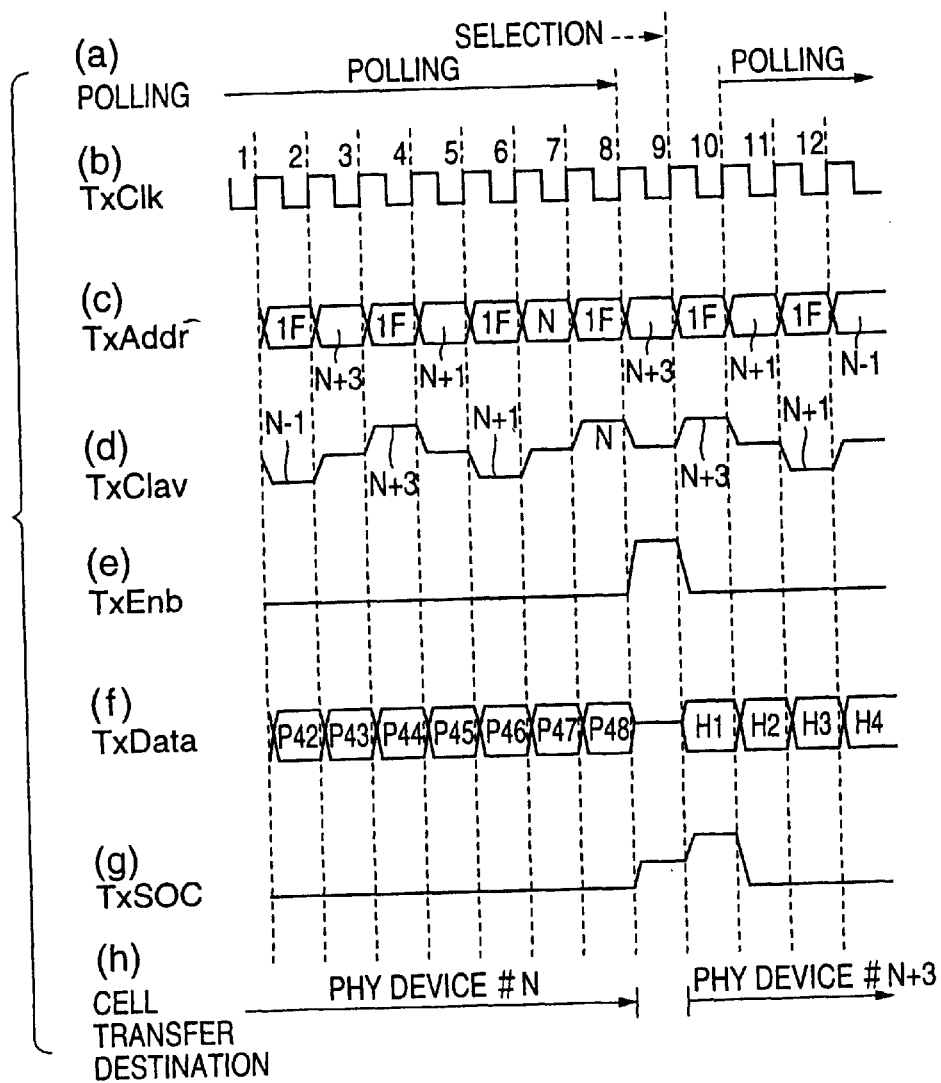
FIG. 7 is a time chart of a transmit operation in the Level 2 UTOPIA interface.
Figure 8:
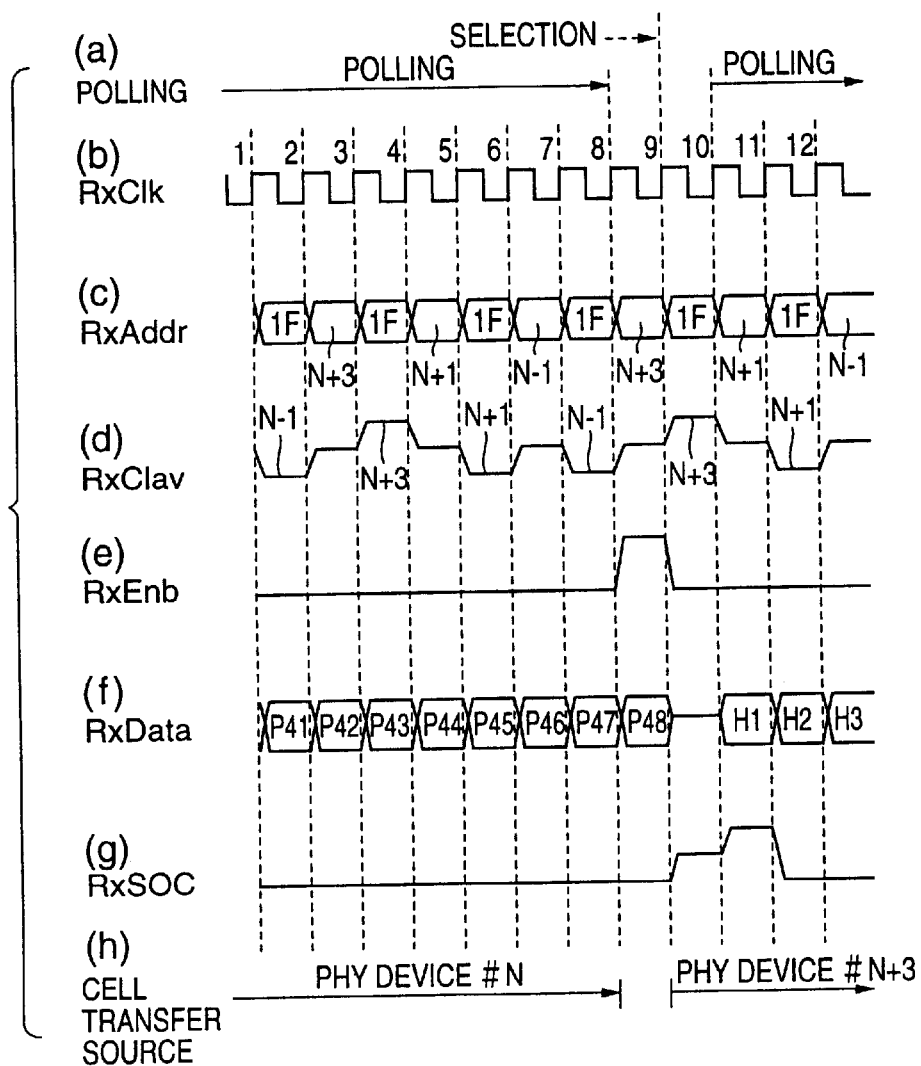
FIG. 8 is a time chart of a receive operation of the Level 2 UTOPIA interface.
Figure 19:
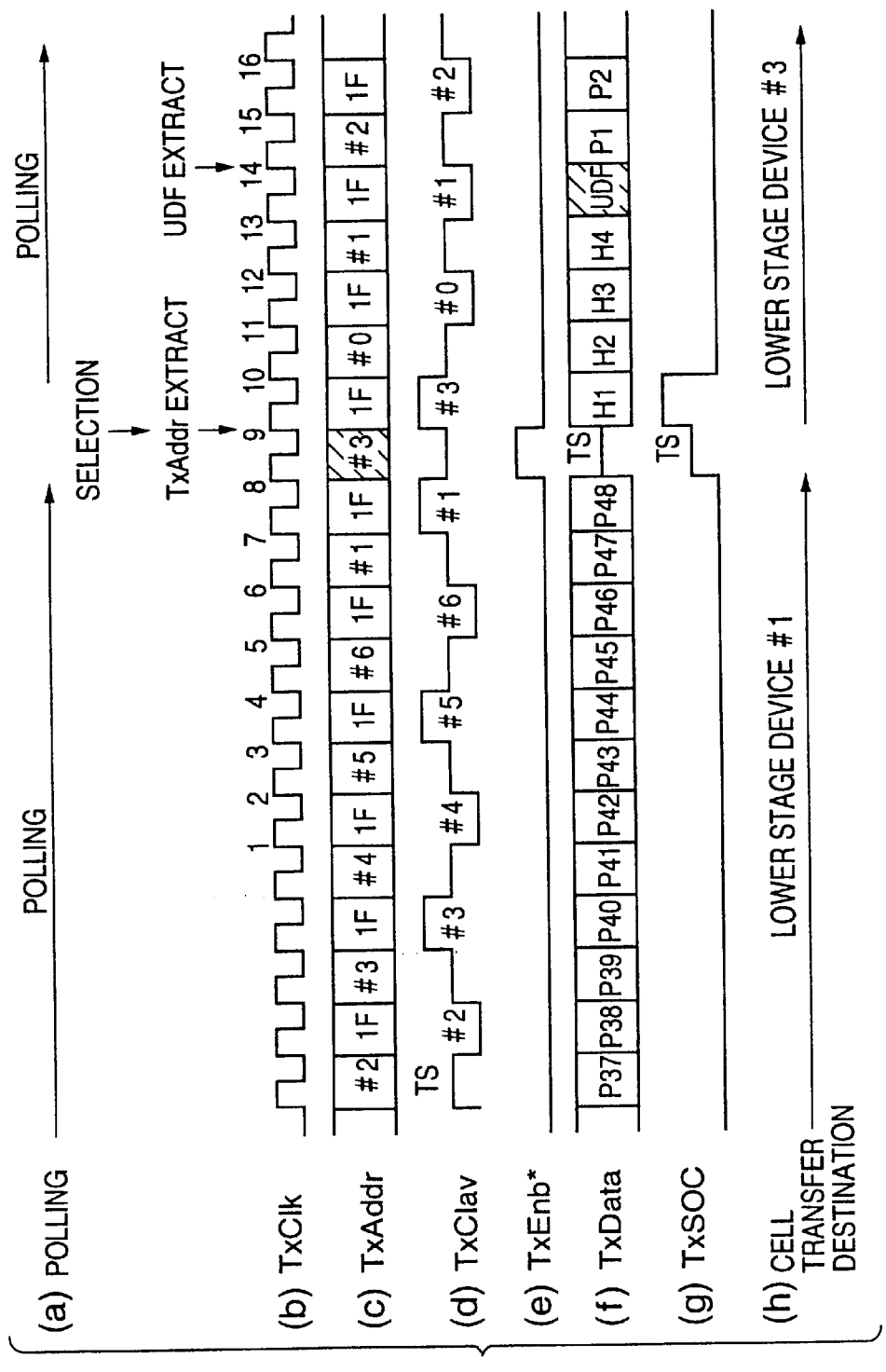
FIG. 19 is a timing chart of an operation in which routing information is extracted in transmit operation.

FIG. 19 is a time chart of extracting the routing information in transmit operation. Signal transmit and receive operation shown in FIG. 19 is the same as that shown in FIG. 7, and a detailed description thereof will be omitted.

Referring to FIG. 19, an ATM cell is being transmitted to PHY layer device #3. During this transmission of the ATM cell, PHY layer devices of the lower stage are subjected to polling. FIG. 19 shows that the result of polling indicates that an ATM cell can be transmitted to devices #3 and #5.

When the transfer of the ATM cell to device #1 is completed and then an ATM cell should be transferred to device #3, the transmit address signal TxAddr including the address of device #3 is sent at the timing given shading in part (c) of FIG. 19. Device #3 extracts the transmit address signal TxAddr in response to the rising edge of clock 9 shown in part (b) of FIG. 19.

At the timing given shading in part (f) of FIG. 19, remaining routing information is inserted into the user defined field UDF and is then sent out. Device #3 extracts a data signal of the user defined field UDF in synchronism with the rising edge of clock 14. Then device #3 extracts the routing information by using the already extracted transmit address signal TxAddr and the data signal of the user defined field UDF.

Figure 20:
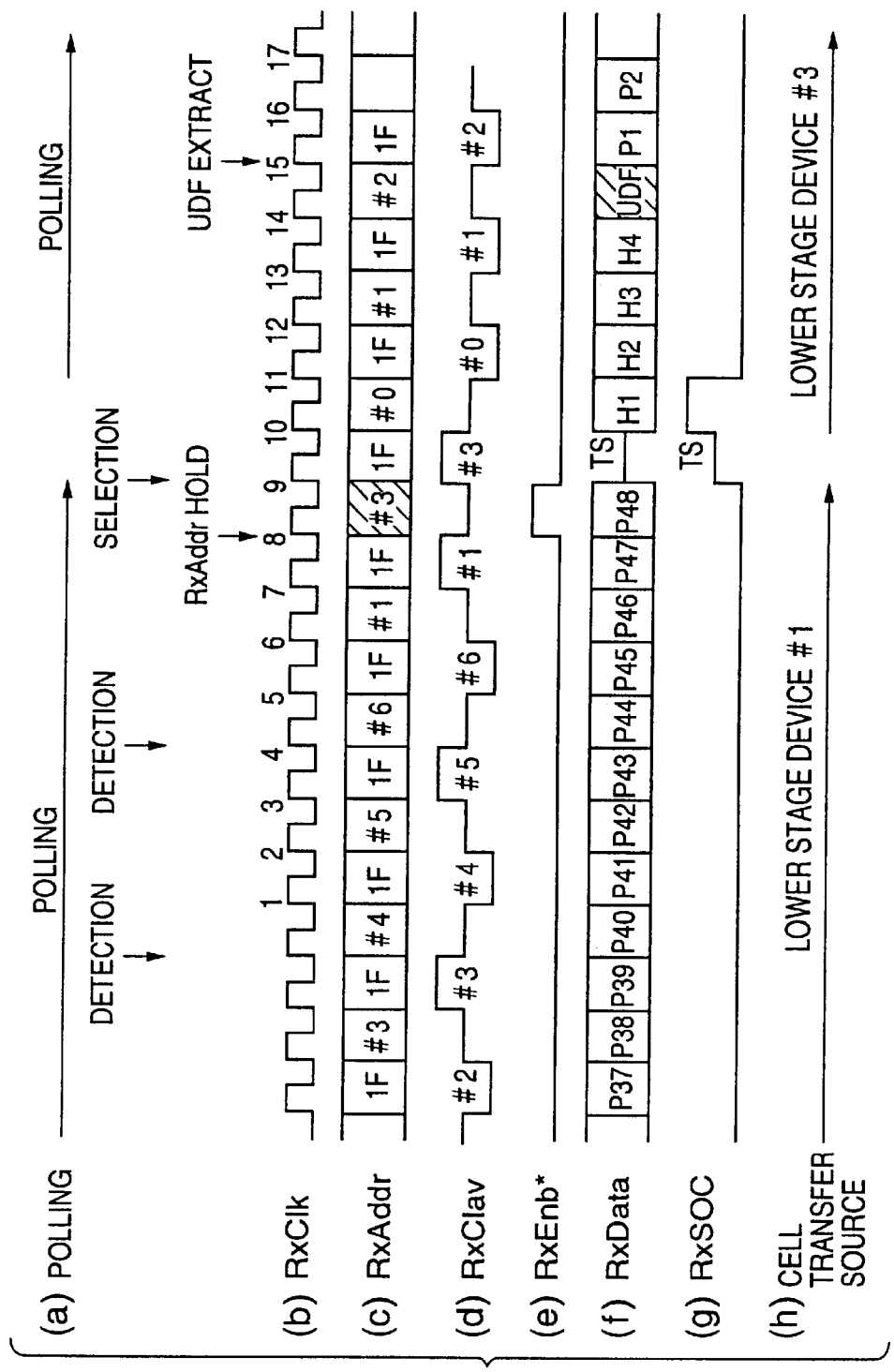
FIG. 20 is a timing chart of an operation in which routing information is extracted in receive operation.

FIG. 20 is a timing chart of extracting routing information in receive operation. Signal transmit and receive operation shown in FIG. 20 is the same as that shown in FIG. 19.

Referring to FIG. 20, an ATM cell is being received from PHY layer device of the lower stage. During this reception of the ATM cell, PHY layer devices of the lower stage are subjected to polling. FIG. 20 shows that the result of polling indicates that devices #3 and #5 requests sending of an ATM cell.

When the transfer of the ATM cell from device #1 is completed and then a transfer of an ATM cell from device #3 is permitted, the receive address signal RxAddr including the address of device #3 is sent at the timing given shading in part (c) of FIG. 20, and is held until a data signal of the user defined field UDF is completely extracted.

The data signal of the user defined field UDF sent at the timing given shading in part (f) of FIG. 20 is extracted in response to the rising edge of clock 15. Then, the routing information including control information is extracted by using by using the already extracted receive address signal RxAddr and the data signal of the user defined field UDF.

The present invention is not limited to the specifically described embodiments, and variations and modifications may be made without departing from the scope of the invention.

What is claimed is:

1. An ATM apparatus comprising:
an ATM device; and
a plurality of devices arranged in a multistage formation in which the ATM device is located at a top of the multistage structure,
the ATM device and the plurality of devices employing a given interface using an address signal and a control signal, and transferring routing information including address information on at least one of the devices by using the address signal and a user defined field in a header of an ATM cell,
each of the plurality of devices in the multistage structure being selected by a corresponding bit portion of the address signal and the user defined field.

2. The ATM apparatus as claimed in claim 1, wherein:
the ATM device is equipped with a routing table in which the routing information is stored with regard to a value of a VPI/VCI field provided in the header of the ATM cell; and
the devices arranged in the multistage formation extract the routing information using the address signal and the user defined field of the ATM cell, and performs routing based on extracted routing information.

3. The ATM apparatus as claimed in claim 2, wherein the devices arranged in the multistage formation generate new routing information by a bit shift operation on the extracted routing information, and transfer the new routing information to another device of a lower stage.

4. The ATM apparatus as claimed in claim 1, wherein the address signal and the user defined field form a routing information field in which arbitrary information other than the routing information can be stored.

5. The ATM apparatus as claimed in claim 1, wherein:

the address signal and the user defined field form a routing information field;

the ATM device writes information on multicasting into the routing information field and transfers the information concerning the multicasting to the devices of the lower stage; and each of the devices that receives said information makes a copy of the ATM cell received and performs multicasting.

6. The ATM apparatus as claimed in claim 1, wherein the address signal and the user defined field form a routing information field in which arbitrary information other than the routing information can be stored, the arbitrary information being transferred between the ATM device and the devices of the lowermost stage of the multistage formation.

7. The ATM apparatus as claimed in claim 1, wherein the given interface is a Level 2 UTOPIA interface.

8. The ATM apparatus as claimed in claim 1, wherein the given interface is a Level 2 Utopia interface, and the user defined field is consistent with a cell format of the Level 2 UTOPIA interface.

9. The ATM apparatus as claimed in claim 2, wherein:

the given interface is a Level 2 UTOPIA interface;

the ATM device is an ATM layer device of the Level 2 UTOPIA interface; and the devices arranged in the multistage formation are respectively physical layer devices of the Level 2 UTOPIA interface.

10. An ATM device applicable to an ATM apparatus including a plurality of devices arranged in a multistage formation in which the ATM device is located at a top of the multistage structure, wherein the ATM device and the plurality of devices employ a given interface using an address signal and a control signal, said ATM device comprising:

an ATM switch which switches an ATM cell; and a routing table that stores routing information with regard to a value of a VPI/VCI field provided in a header of the ATM cell, the routing information including address information concerning the plurality of devices formed by using corresponding bit portions of the address signal and a user defined field in the header of the ATM cell.

11. The ATM device as claimed in claim 10, wherein the given interface is a Level 2 UTOPIA interface.

12. The ATM device as claimed in claim 10, wherein the given interface is a Level 2 UTOPIA interface, and the user defined field is consistent with a cell format of the Level 2 UTOPIA interface.

13. The ATM apparatus as claimed in claim 3, wherein said bit shift operation is performed in units of the corresponding bit portions.

* * * * *